(12) United States Patent
Colliat et al.

(10) Patent No.: US 11,292,913 B2
(45) Date of Patent: Apr. 5, 2022

(54) BITUMEN SOLID AT AMBIENT TEMPERATURE

(71) Applicant: TOTAL MARKETING SERVICES, Puteaux (FR)

(72) Inventors: Romain Colliat, Ruy Montceau (FR); Yvong Hung, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 65 days.

(21) Appl. No.: 16/606,943

(22) PCT Filed: Apr. 18, 2018

(86) PCT No.: PCT/FR2018/050973
§ 371 (c)(1),
(2) Date: Oct. 21, 2019

(87) PCT Pub. No.: WO2018/193210
PCT Pub. Date: Oct. 25, 2018

(65) Prior Publication Data
US 2020/0165458 A1     May 28, 2020

(30) Foreign Application Priority Data

Apr. 21, 2017 (FR) .................................. 1753473

(51) Int. Cl.
*C08L 95/00* (2006.01)
*C08L 1/28* (2006.01)
(Continued)

(52) U.S. Cl.
CPC ............... *C08L 95/00* (2013.01); *C08L 1/284* (2013.01); *C10C 3/10* (2013.01); *E01C 7/18* (2013.01)

(58) Field of Classification Search
CPC ...................................................... C08L 95/00
See application file for complete search history.

(56) References Cited

U.S. PATENT DOCUMENTS 3,026,568 A    3/1962   Moar
4,279,579 A    7/1981   Froeschke
(Continued)

FOREIGN PATENT DOCUMENTS

EP      0 199 475 A1    10/1986
EP      1 328 607 A2     7/2003
(Continued)

OTHER PUBLICATIONS

Abbas et al. (International Journal of Automotive and Mechanical Engineering, vol. 8, p. 1218-1225, 2013) (Year: 2013).*
(Continued)

*Primary Examiner* — Liam J Heincer
(74) *Attorney, Agent, or Firm* — Oliff PLC

(57) ABSTRACT

Granules of material usable as a road binder or as a sealing binder including a core and a coating layer, wherein: the core consists of a first composition including at least one material selected from: a bitumen base, a pitch, a clear binder, and the coating layer consists of a second composition which includes: at least one viscosifying compound selected from cellulose ethers, and at least one anticaking agent. Also, a method for producing granules of material that can be used as a road binder or as a sealing binder, and the use thereof as a road binder, in particular for the production of coated materials. Also, a method for producing coatings from granules of material that can be used as a road binder or as a sealing binder and to a method for transporting and/or storing and/or handling granules.

18 Claims, 1 Drawing Sheet

(51) Int. Cl.
*C10C 3/10* (2006.01)
*E01C 7/18* (2006.01)

(56) References Cited

U.S. PATENT DOCUMENTS

| | | | |
|---|---|---|---|
| 4,585,816 A * | 4/1986 | Vitkuske | C08J 3/005 |
| | | | 523/351 |
| 5,236,503 A | 8/1993 | Jones | |
| 5,340,391 A * | 8/1994 | Grzybowski | C08L 95/00 |
| | | | 106/277 |
| 5,362,314 A * | 11/1994 | Vicenzi | C08K 3/346 |
| | | | 106/277 |
| 5,880,185 A | 3/1999 | Planche et al. | |
| 9,442,219 B2 | 9/2016 | Shiao et al. | |
| 2003/0149138 A1 | 8/2003 | Lemoine et al. | |
| 2006/0260508 A1 | 11/2006 | Bailey | |
| 2007/0221095 A1 * | 9/2007 | Mehta | C08L 95/00 |
| | | | 106/280 |
| 2008/0257213 A1 * | 10/2008 | Friedrrich | C09C 1/24 |
| | | | 106/281.1 |
| 2010/0056669 A1 | 3/2010 | Bailey | |
| 2011/0233105 A1 | 9/2011 | Bailey | |
| 2011/0257318 A1 | 10/2011 | Neuville et al. | |
| 2012/0123028 A1 | 5/2012 | Dreesen et al. | |
| 2014/0174643 A1 * | 6/2014 | De Amorim Novais Da Costa Nobrega | E01C 7/18 |
| | | | 156/247 |
| 2016/0222542 A1 | 8/2016 | Garandet et al. | |
| 2017/0226320 A1 | 8/2017 | Mariotti et al. | |
| 2018/0155629 A1 * | 6/2018 | Vincent | C08L 71/02 |
| 2019/0330473 A1 * | 10/2019 | Mouazen | C08K 5/20 |
| 2019/0359526 A1 * | 11/2019 | Hung | C08K 5/092 |
| 2020/0040187 A1 * | 2/2020 | Hung | E01C 7/18 |
| 2020/0247011 A1 * | 8/2020 | Anaclet | C08L 95/00 |

FOREIGN PATENT DOCUMENTS

| | | |
|---|---|---|
| EP | 1 407 814 A1 | 4/2004 |
| EP | 1 432 778 A2 | 6/2004 |
| EP | 1 473 327 A1 | 11/2004 |
| EP | 1 783 174 A1 | 5/2007 |
| WO | 2007/058994 A2 | 5/2007 |
| WO | 2008/137394 A1 | 11/2008 |
| WO | 2009/150519 A2 | 12/2009 |
| WO | 2009/153324 A1 | 12/2009 |
| WO | 2012/168380 A1 | 12/2012 |
| WO | WO-2016016318 A1 * | 2/2016 ............. C08K 5/092 |

OTHER PUBLICATIONS

Lee et al. "Separation of Solvent and Deasphalted Oil for Solvent Deasphalting Process". Fuel Processing Technology, vol. 119, pp. 204-210. 2014.

Oct. 22, 2019 International Preliminary Report on Patentability issued in International Patent Application No. PCT/FR2018/050973.

Jul. 5, 2018 Search Report issued in International Patent Application No. PCT/FR2018/050973.

Foroughi-Dahr, M., Mostoufi, N., Sotudeh-Gharebagh, R., & Chaouki, J., "Particle coating in fluidized beds", Reference Module in Chemistry, Molecular Sciences and Chemical Engineering, Elsevier Inc, 2017, pp. 1-2, 8-11, 14.

Mar. 24, 2021 Office Action in Indian Application No. 201947042143.

* cited by examiner

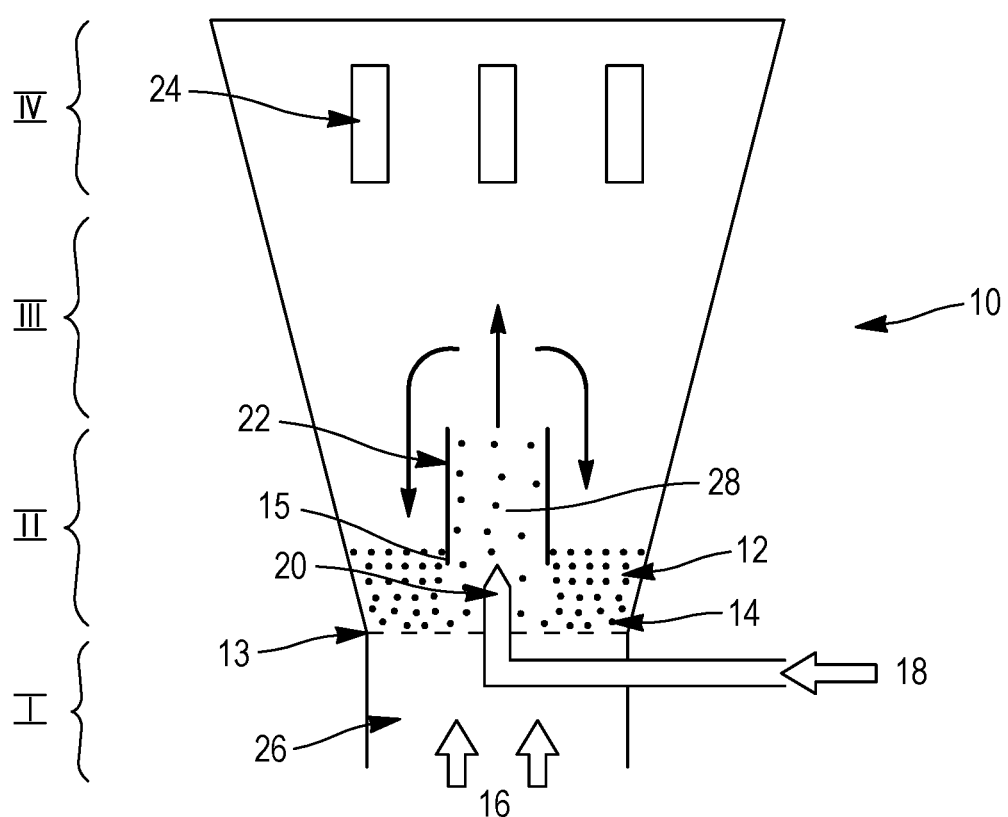

BITUMEN SOLID AT AMBIENT TEMPERATURE

TECHNICAL FIELD

A subject of the present invention is pellets of a material that is solid at ambient temperature, and that can be used as a road binder or as a sealing binder, such as a road bitumen, a pitch, a clear binder or a bitumen/polymer composition. The present invention also relates to a process for preparing these pellets, and also to the use thereof as a road binder, in particular for the manufacture of bituminous mixes.

The present invention also relates to a process for manufacturing bituminous mixes from the pellets according to the invention and also to a process for transporting and/or storing and/or handling these bitumen pellets at ambient temperature, in particular at high ambient temperature.

PRIOR ART

Bitumen is used in the vast majority in construction, mainly in the manufacture of roadways or in industry, for example for roofing applications. It is generally provided in the form of a black material which is highly viscous, or even solid, at ambient temperature and which fluidifies on heating.

In general, bitumen is stored and transported hot, in bulk, in tank trucks or by boat at high temperatures of the order of 120° C. to 160° C. However, the storage and transportation of bitumen under hot conditions presents certain drawbacks. Firstly, the transportation of bitumen under hot conditions in the liquid form is considered to be dangerous and it is highly restricted from a regulatory viewpoint. This mode of transportation does not present any particular difficulties when the transportation equipment and infrastructures are in good condition. If this is not the case, it can become problematic: if the tank truck is not sufficiently lagged, the viscosity of the bitumen can increase during an excessively long trip. Bitumen delivery distances are therefore limited. Secondly, keeping bitumen at high temperatures in vessels or in tank trucks consumes energy. In addition, keeping bitumen at high temperatures for a lengthy period can affect the properties of the bitumen and thus change the final performance qualities of the bituminous mix.

To overcome the problems of transporting and storing hot bitumen, packagings enabling the transportation and storage of bitumens at ambient temperature have been developed. This mode of transportation of bitumen in packaging at ambient temperature represents only a minimal fraction of the amounts transported worldwide but it corresponds to very real needs for geographic regions which are difficult and expensive to access by conventional transportation means.

Mention may be made, by way of example of packaging which makes possible transportation under cold conditions currently used, of packaging bitumen at ambient temperature in metal drums. This means is increasingly questionable from an environmental viewpoint because the bitumen stored in the drums must be reheated before it is used as a road binder. However, this operation is difficult to perform for this type of packaging, and the drums constitute waste after use. Furthermore, the storage of bitumen at ambient temperature in drums results in losses because the bitumen is very viscous and a part of the product remains on the walls of the drum when the bitumen is transferred into the vessels of the units for the manufacture of bituminous mixes. With regard to the handling and the transportation of bituminous products in these drums, they can prove to be difficult and dangerous if specialized equipment for handling the drums is not available to the haulage contractors or at the site where the bitumen is used.

Mention may be made, as other examples of packaging, of bitumens in the form of pellets transported and/or stored in bags, often used in places where the ambient temperature is high. These pellets have the advantage of being easy to handle.

The same difficulty is encountered in the handling, packaging and storage of pitches and bituminous compositions comprising clear binders, bitumen/polymer compositions, in particular stock solutions of bitumen/polymer compositions.

U.S. Pat. No. 3,026,568 describes bitumen pellets covered with a dusty material, such as limestone powder. Nevertheless, this type of bitumen as pellets does not prevent the bitumen from creeping, in particular at high ambient temperature.

Patent application WO 2009/153324 describes bitumen pellets coated with a polymeric anticaking compound, in particular polyethylene. The disadvantage of this coating is that it modifies the properties of the bitumen during its road application.

Patent application WO 2016/016318 describes bitumen pellets comprising a chemical additive. These bitumen pellets allow the transportation and/or storage and/or handling of the bitumen at ambient temperature without the bitumen undergoing creep, and also the reduction in their adhesion and agglomeration together.

Patent application WO 2016/198782 describes bitumens that are solid at ambient temperature in the form of pellets comprising a core and a coating layer, wherein:
  the core comprises at least one bitumen base, and
  the coating layer comprises at least 10% by weight of one or more viscosifying compounds relative to the total weight of the coating layer, and at least one anticaking compound.

The viscosifying compounds illustrated in WO 2016/198782 are based on gelatin. These pellets have satisfactory use properties; however, they have the disadvantage of requiring an additional step after the coating of the cores with the coating layer so as to allow formation of a shell around the cores.

Application US 2011/233105 describes storage-stable asphalt pellets which have a core/envelope structure. The core of the pellets consists of a mixture of a bituminous material obtained by recycling shingles of a bituminous binder. The envelope, in particular based on fines, minerals or ground plastics, or else on clay, makes it possible to prevent caking of the pellets during their storage.

In the continuation of its work, the applicant discovered, surprisingly, a novel composition of pellets of material that is solid at ambient temperature, and that can be used as a road binder or as a sealing binder, such as a road bitumen, a pitch, a bitumen/polymer composition or a clear binder, making it possible to avoid and to reduce adhesion and agglomeration during the transportation and/or storage and/or handling thereof, at high ambient temperature, over long periods, and for which the properties are conserved over time relative to the pellets of the prior art.

More specifically, the applicant demonstrated that this novel pellet composition makes it possible to withstand creep under extreme transportation and/or storage and/or handling conditions, under compression conditions, in particular due to storage, over very long periods.

SUMMARY OF THE INVENTION

A subject of the invention is pellets of material that can be used as a road binder or as a sealing binder, comprising a core and a coating layer, wherein:
the core consists of a first composition comprising at least one material chosen from: a bitumen base, a pitch and a clear binder, and
the coating layer consists of a second composition which comprises:
at least one viscosifying compound chosen from cellulose ethers, and
at least one anticaking agent.

The invention also relates to a process for manufacturing pellets of material that can be used as a road binder or as a sealing binder, composed of a core and a core coating layer, this process comprising:
i) shaping the core from a first composition comprising at least one material chosen from: a bitumen base, a pitch and a clear binder,
ii) coating the core on all or part of its surface with a second composition comprising at least one viscosifying compound chosen from cellulose ethers, and at least one anticaking agent.

The invention also relates to pellets of material that can be used as a road binder or as a sealing binder, capable of being obtained by carrying out this process.

According to one embodiment of the invention, the cellulose ether is chosen from: methylcellulose, ethylcellulose, hydroxymethylcellulose, hydroxyethylcellulose (HEC), hydroxypropylcellulose (HPC), hydroxyethylmethylcellulose (NEMC), hydroxypropyl-methylcellulose (HPMC), hydroxybutylmethylcellulose (HBMC), carboxymethylcellulose (CMC), sodium carboxymethylcellulose (Na-CMC), carboxymethylsulfoethylcellulose, hydroxyethylmethylcarboxymethylcellulose.

According to one preferred embodiment of the invention, the cellulose ether is chosen from: hydroxyethylmethylcellulose, hydroxypropylmethylcellulose, hydroxybutylmethylcellulose, even more advantageously hydroxypropyl methylcellulose.

According to one embodiment of the invention, the second composition comprises at least 10% of one or more anticaking agents, the percentages being expressed by weight relative to the total weight of the second composition.

According to one preferred embodiment of the invention, the second composition comprises: at least 20% of one or more anticaking agents, even better still at least 30%, advantageously at least 40%, even better still at least 50% of one or more anticaking agents, and optionally one or more plasticizers, the percentages being expressed by weight relative to the total weight of the second composition.

Preferably, the anticaking compound is chosen from: talc; fines generally less than 125 µm in diameter, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as fumed silica, functionalized fumed silica, in particular hydrophobic or hydrophilic fumed silica, pyrogenic silicas, in particular hydrophobic or hydrophilic pyrogenic silicas, silicates, silicon hydroxides and silicon oxides; plastic powder; lime; hydrated lime; plaster; rubber crumb; polymer powder, where the polymers are such as styrene/butadiene (SB) copolymers or styrene/butadiene/styrene (SBS) copolymers; and mixtures of these materials.

According to one embodiment of the invention, the first composition has a needle penetrability measured at 25° C. according to the standard EN 1426 of from 5 to 330$^1$/$_{10}$ mm, preferably from 10 to 220$^1$/$_{10}$ mm.

According to one embodiment of the invention, the bitumen base also comprises at least one chemical additive chosen from: an organic compound, a paraffin, a polyphosphoric acid, an adhesion dopant, and mixtures thereof.

According to one embodiment of the invention, the first composition comprising at least one chemical additive has a penetrability of from 5 to 45$^1$/$_{10}$ mm, measured at 25° C. according to the standard EN 1426 and/or a ring and ball softening point greater than or equal to 90° C., the ring and ball softening point being measured according to the standard EN 1427.

According to one preferred embodiment, the pellets of material that can be used as a road binder or as a sealing binder show stability on transportation and/or storage and/or handling at a temperature ranging up to 100° C., advantageously from 20° C. to 90° C., preferably from 20° C. to 80° C., more preferentially from 40° C. to 80° C., even more preferentially from 40° C. to 60° C., for a period of greater than or equal to 2 months, preferably greater than or equal to 3 months.

According to one preferred embodiment, in the process of the invention, the second composition is applied to the core of the pellets in a fluidized air bed device.

The invention also relates to the use of the pellets defined above as a road binder.

According to one preferred embodiment, the use relates to the manufacture of bituminous mixes.

The invention also relates to a process for manufacturing bituminous mixes comprising at least one road binder and aggregates, the road binder being chosen from the pellets defined above, this process comprising at least the steps of:
heating the aggregates to a temperature ranging from 100° C. to 180° C., preferably from 120° C. to 160° C.,
mixing the aggregates with the road binder in a tank such as a mixer or a mixing drum,
obtaining bituminous mixes.

According to one preferred embodiment, the process for manufacturing bituminous mixes does not include a step of heating the road binder before it is mixed with the aggregates.

Finally, the invention relates to a process for transporting and/or storing and/or handling material that can be used as a road binder or as a sealing binder, said material being transported and/or stored and/or handled in the form of pellets as defined above.

DETAILED DESCRIPTION

The objectives that the applicant has set have been achieved by developing compositions of material that can be used as a road binder or as a sealing binder, in a divided form, having a core/shell structure, in which the core is based on a first composition and the coating layer gives the overall structure improved properties under extreme transportation and/or storage and/or handling conditions compared to the pellets of material that can be used as a road binder or as a sealing binder that are known from the prior art.

A first subject of the invention relates to pellets of material that can be used as a road binder or as a sealing binder, comprising a core and a coating layer, wherein:

the core consists of a first composition which comprises
at least one material chosen from: a bitumen base, a pitch and a clear binder,
and
the coating layer consists of a second composition which comprises:
at least one viscosifying compound chosen from cellulose ethers, and
at least one first anticaking agent.

The term "high ambient temperature" is intended to mean the temperature resulting from the climatic conditions under which is transported and/or stored and/or handled the material that can be used as a road binder or as a sealing binder, in particular road bitumen. More specifically, the high ambient temperature is equivalent to the temperature reached during the transportation and/or storage of the material that can be used as a road binder or as a sealing binder, in particular the road bitumen, this temperature being less than 100° C. Advantageously, the high ambient temperature is from 20° C. to 90° C., preferably from 20° C. to 80° C., more preferentially from 40° C. to 80° C., and even more preferentially from 40° C. to 60° C., it being understood that high ambient temperature implies that no heat is supplied other than that resulting from the climatic conditions.

The invention relates to materials that can be used as a road binder or as a sealing binder, in particular bitumens that can be solid when subjected to high ambient temperatures, in particular a temperature ranging up to 100° C., advantageously from 20° C. to 90° C., preferably from 20° C. to 80° C., more preferentially from 40° C. to 80° C., even more preferentially from 40° C. to 60° C.

For the purposes of the present invention, the term "material that can be used as a road binder or as a sealing binder" refers to any material that may be used for this purpose, and especially: bitumen bases, bitumen/polymer compositions, additivated bitumen compositions, pitches, bitumen-polymer stock solutions, clear binders, clear binder-polymer stock solutions, and mixtures of these materials in all proportions.

The term "material that is solid at high ambient temperature" is intended to mean a material which has a solid appearance at high ambient temperature under transportation and/or storage and/or handling conditions. More specifically, the term "material that is solid at high ambient temperature" is intended to mean a material which retains its solid appearance throughout the transportation and/or storage and/or handling at high ambient temperature, i.e. a material which does not creep at a temperature ranging up to 100° C., advantageously from 20° C. to 90° C., preferably from 20° C. to 80° C., more preferentially from 40° C. to 80° C. and even more preferentially from 40° C. to 60° C., under its own weight and, furthermore, which does not creep when it is subjected to a temperature ranging up to 100° C., advantageously from 20° C. to 90° C., preferably from 20° C. to 80° C., more preferentially from 40° C. to 80° C. and even more preferentially from 40° C. to 60° C., and to pressure forces derived from the transportation and/or storage and/or handling conditions.

The term "bitumen that is solid at ambient temperature" is intended to mean a bitumen which has a solid appearance at ambient temperature, irrespective of the transportation and/or storage conditions. More specifically, the term "bitumen that is solid at ambient temperature" is intended to mean a bitumen which conserves its solid appearance throughout the transportation and/or storage at ambient temperature, i.e. a bitumen which does not undergo creep at ambient temperature under its own weight and, moreover, which does not undergo creep when it is subjected to pressure forces arising from the transportation and/or storage conditions.

The term "coating layer covering all or part of the surface of the core" is intended to mean that the coating layer covers at least 90% of the surface of the core, preferably at least 95% of the surface of the core and more preferentially at least 99% of the surface of the core.

The expression "is essentially composed of", followed by one or more characteristics, is intended to mean that, besides the components or steps explicitly listed, components or steps which do not significantly modify the properties and characteristics of the invention can be included in the process or the material of the invention.

The expression "between X and Y" includes the limits. This expression thus means that the range targeted comprises the values X, Y and all the values ranging from X to Y.

The composition according to the invention makes it possible to obtain pellets of solid material that can be used as a road binder or as a sealing binder, in particular of bitumen, comprising a coating layer which withstands the climatic conditions and the conditions of transportation and/or storage of road binders and/or sealing binders, in particular which withstands the climatic conditions and the conditions of transportation and/or storage of solid road bitumen, and which breaks easily under a mechanical shear effect, for instance under the effect of mechanical shear applied in a tank such as a mixer or a mixing drum during the manufacture of bituminous mixes.

More particularly, the coating layer withstands the transportation and/or storage of road binders and/or sealing binders, in particular bitumen, at ambient temperature in "big bags" while at the same time being brittle under the effect of mechanical shear. It thus allows the release of the bitumen core during the manufacture of bituminous mixes.

The Core of the Pellets/First Composition:

First Variant:

According to a first variant, the cores of the pellets of material that can be used as a road binder or as a sealing binder are prepared from a first bitumen composition comprising one or more bitumen bases.

Preferably, the bitumen pellets are prepared from a first bitumen composition comprising:
one or more bitumen bases,
from 0.1% to 5% by weight, preferably from 0.5% to 4% by weight and more preferentially from 0.5% to 2.5% by weight of at least one chemical additive,
the percentages being on a weight basis relative to the total weight of the bitumen base.

The bitumen base and the chemical additive are as described below.

Preferably, the bitumen pellets are prepared from a first bitumen composition comprising:
one or more bitumen bases,
from 0.1% to 5% by weight, preferably from 0.5% to 4% by weight and more preferentially from 0.5% to 2.5% by weight of at least one chemical additive, and
from 0.5% to 20% by weight, preferably from 2% to 20% by weight, more preferentially from 4% to 15% by weight of at least one anticaking agent,
the percentages being on a weight basis relative to the total weight of the bitumen base.

According to a second preferred embodiment, the cores of the pellets are prepared from a first composition comprising:
one or more bitumen bases, between 0.1% and 5% by weight, preferably between 0.5% and 4% by weight, more preferentially between 0.5% and 2.5% by weight of at least one chemical additive, and between 0.05% and 15% by weight, preferably between 0.1% and 10% by weight, more preferentially between 0.5% and 6% by weight of at least one olefinic polymer adjuvant, the percentages being on a weight basis relative to the total weight of the bitumen base.

According to a third preferred embodiment, the cores of the pellets are prepared from a first composition comprising:
one or more bitumen bases,
between 0.1% and 5% by weight, preferably between 0.5% and 4% by weight, more preferentially between 0.5% and 2.5% by weight of at least one chemical additive,
and between 0.05% and 15% by weight, preferably between 0.1% and 10% by weight, more preferentially between 0.5% and 6% by weight of at least one polymer, the percentages being on a weight basis relative to the total weight of the bitumen base.

Advantageously, the various embodiments described above for the pellets may be combined together.

Second Variant:

According to a second variant, the cores of the pellets of material that can be used as a road binder or as a sealing binder are prepared from a first composition comprising at least one pitch.

According to a first embodiment, the cores of the pellets consist of a first composition based on pitch.

According to a second embodiment, the cores of the pellets consist of a first composition based on pitch and on at least one bitumen base.

According to one embodiment of this variant, the first composition comprises at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427.

According to one embodiment of this variant, the first composition comprises:
at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427,
at least one bitumen base, and
at least one chemical additive.

Third Variant:

According to a third variant, the pellets of material that can be used as a road binder or as a sealing binder are prepared from a first composition comprising at least one clear binder.

Conventional bituminous binders, due to the presence of asphaltenes, are black in color and are therefore difficult to color. Colored coatings are increasingly used because they make it possible, among other things, to improve the safety of road users by clearly identifying specific routes such as pedestrian routes, bicycle lanes and bus lanes. They also make it possible to materialize certain danger zones such as entrances to urban areas or dangerous bends. Colored coatings promote visibility in low light conditions, for example at night or in particular sites such as tunnels. Finally, they quite simply improve the esthetic appearance of urban roads and can be used for public squares, courtyards and school yards, sidewalks, pedestrian streets, garden and park paths, parking areas and rest areas.

Consequently, for all the abovementioned applications, it is preferred to use synthetic clear binders, which do not contain asphaltenes and which can be colored.

According to this variant, the first composition comprises at least one clear binder.

Advantageously, the first composition comprises at least one clear binder base and at least one chemical additive chosen from an organic compound, a paraffin, a polyphosphoric acid, and mixtures thereof.

According to one embodiment of the invention, the first composition comprises from 0.1% to 5% by weight, preferably from 0.5% to 4% by weight, more preferentially from 0.5% to 2.5% by weight of said chemical additive relative to the total weight of said additivated clear binder.

According to one embodiment of the invention, the first composition comprises
at least one clear binder base,
between 5% and 30% by weight, preferably between 6% and 28% by weight, more preferentially between 7% and 26% by weight of the chemical additive(s) relative to the total weight of said clear binder base.

In this case, the first composition is said to be a concentrated clear binder.

According to one preferred embodiment, the pellets are prepared from a first composition comprising:
one or more clear binder bases,
from 30% to 40% of at least one polymer,
from 4% to 6% of at least one compatibilizer,
from 3% to 15% of at least one anticaking agent,
the percentages being on a weight basis relative to the total weight of the first composition.

The expression "clear binder that is solid under cold conditions and in divided form" is intended to mean a clear binder that is solid at ambient temperature and that is packaged in a divided form, i.e. in the form of units which are distinct from one another, referred to as pellets.

The clear binder according to the invention is denoted without difference in the present description as "clear binder that is solid under cold conditions and in divided form" or "additivated clear binder".

Preferably, the clear binder is a composition that can be used as a substitute for bitumen-based binders for the preparation, for example, of a colored bitumen mix. A clear binder is free of asphaltenes and can therefore keep the natural color of the aggregate with which it is mixed or be easily colored with pigments.

The Bitumen Base

Advantageously, the nucleus or core of the solid bitumen pellets according to the invention is prepared from a first composition, which is a road bitumen composition, said first composition being prepared by placing in contact:
one or more bitumen bases, and
optionally at least one chemical additive.

For the purposes of the invention, the terms "bitumen" and "road bitumen" are used equivalently and independently of one another. The term "bitumen" or "road bitumen" is intended to mean any bituminous composition consisting of one or more bitumen bases and optionally comprising one or more chemical additives, said compositions being intended for a road application.

Mention may first of all be made, among the bitumen bases that can be used according to the invention, of bitumens of natural origin, those present in natural bitumen or natural asphalt deposits or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches. The bitumen bases may be obtained via conventional processes for manufacturing bitumen bases at a refinery, in particular by direct distillation and/or vacuum distillation of oil. These bitumen bases can optionally be visbroken and/or deasphalted and/or air-rectified. It is common practice to perform vacuum distillation on the atmospheric residues originating from the atmospheric distillation of crude oil. This manufacturing process consequently corresponds to the sequence of an atmospheric distillation and of a vacuum distillation, the feedstock supplying the vacuum distillation corresponding to the atmospheric residues. These vacuum residues derived from the vacuum distillation tower may also be used as bitumens. It is also standard to inject air into a feedstock generally composed of distillates and of heavy products originating from the vacuum distillation of atmospheric residues originating from the distillation of oil. This process makes it possible to obtain a blown or semi-blown or oxidized or air-rectified or partially air-rectified base.

The various bitumen bases obtained via the refining processes may be combined together to obtain the best technical compromise. The bitumen base may also be a recycled bitumen base. The bitumen bases may be bitumen bases of hard grade or of soft grade.

According to the invention, for conventional processes for the manufacture of bitumen bases, the operation is carried out at manufacturing temperatures of between 100° C. and 200° C., preferably between 140° C. and 200° C., more preferably between 140° C. and 170° C., and with stirring for a period of time of at least 10 minutes, preferably of between 30 minutes and 10 hours, more preferably between 1 hour and 6 hours. The term "manufacturing temperature" is intended to mean the temperature of heating of the bitumen base(s) before mixing and also the mixing temperature. The heating time and temperature vary according to the amount of bitumen used and are defined by the standard NF EN 12594.

According to the invention, blown bitumens can be manufactured in a blowing unit by passing a stream of air and/or oxygen through a starting bituminous base. This operation may be performed in the presence of an oxidation catalyst, for example phosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

Preferably, the bitumen base employed to manufacture the pellets of the invention exhibits a needle penetrability, measured at 25° C. according to the standard EN 1426, of 5 to 330 1/10 mm, preferably of 10 to 220 1/10 mm.

In a well-known way, the "needle penetrability" measurement is carried out by means of an NF EN 1426 standardized test at 25° C. ($P_{25}$). This penetration characteristic is expressed in tenths of a millimeter (dmm or 1/10 mm). The needle penetration, measured at 25° C., according to the NF EN 1426 standardized test, represents the measurement of the penetration of a needle, the weight of which with its support is 100 g, into a bitumen sample, after a time of 5 seconds. The standard NF EN 1426 replaces the equivalent standard NF T 66-004 of December 1986 with effect on Dec. 20, 1999 (decision of the Director General of AFNOR dated Nov. 20, 1999).

The Clear Binder Base

The term "clear binder base" is intended to mean compositions comprising a plasticizer, for example an oil of petroleum origin or of plant origin, a structuring agent, for example a hydrocarbon-based resin, and a polymer. The composition of the clear binder bases determines certain essential properties of these binders, in particular the plasticity index, the viscosity of the binder, or the color which must be as clear as possible.

According to one embodiment of the invention, the clear binder base comprises:
  a plasticizer, for example a natural or synthetic oil, free of asphaltenes,
  a structuring agent, for example a hydrocarbon-based or plant resin,
  a copolymer,
  where appropriate, doping agents, or dopants, or adhesion dopants.

Clear binder compositions are described in the following patent applications and these clear binder compositions may be used as clear binder base in the present invention.

A clear binder comprising hydrogenated white oils comprising at least 60% of paraffinic carbons (according to the ASTM D2140 method), and a hydrocarbon-based resin, where appropriate mixed with ethylene-vinyl acetate (EVA) copolymers or low density polyethylene, for example of the EPDM (ethylene-propylene-diene-monomer) type, as described in WO 01/53409, may be used as clear binder base.

A clear binder comprising an oil with a naphthenic content between 35% and 80% and a hydrocarbon-based resin, as described in EP 1783174, may be used as clear binder base.

A clear binder comprising a synthetic oil, a resin and an SBS or SIS type polymer, as described in EP 1473327, may be used as clear binder base.

As clear binder base, use may be made of a clear binder comprising:
  at least one oil of petroleum origin, preferably an aromatic oil comprising aromatic extracts of petroleum residues, obtained by extraction or dearomatization of residues from distillations of petroleum fractions,
  at least one resin of plant origin, preferably chosen from rosin esters, esters of glycerol and rosins, esters of pentaerythritol and rosins, taken alone or as a mixture, and
  at least one latex, preferably chosen from acrylic polymer latices, natural rubber latices and synthetic rubber latices, alone or as a mixture, as described in WO 2009/150519.

As clear binder base, use may be made of a synthetic clear binder comprising:
  at least one oil of plant origin, preferably chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof,
  at least one resin of petroleum origin, preferably chosen from resins of hydrocarbon petroleum origin resulting from the copolymerization of aromatic, aliphatic, cyclopentadienic petroleum fractions taken alone or as a mixture, and at least one polymer, preferably chosen from styrene/butadiene copolymers, styrene/isoprene copolymers, ethylene/propene/diene terpolymers, polychloroprenes, ethylene/vinyl acetate copolymers, ethylene/methyl acrylate copolymers, ethylene/butyl acrylate copolymers, ethylene/methyl acrylate/glycidyl methacrylate terpolymers, ethylene/butyl acrylate/maleic anhydride terpolymers, atactic polypropylenes, taken alone or as mixtures, the amount of plant oil in the binder being greater than or equal to 10% by weight and the amount of polymer in the binder being less than or equal to 15% by weight, as described in WO 2010/055491.

According to another embodiment of the invention, the clear binder base comprises:

(i) a plasticizer consisting of an oil containing a total content of paraffinic compounds, measured according to the ASTM D2140 method, of at least 50%, preferably at least 60% by weight, more preferentially of between 50% and 90%, preferably between 60% and 80%, and (ii) a copolymer based on conjugated diene units and monovinyl aromatic hydrocarbon units, for example based on butadiene units and styrene units.

Preferably, the oil is a synthetic oil derived from deasphalting unit fractions (or "DAO oil").

Preferably, the oil contains a total content of paraffinic compounds greater than or equal to 50%, preferably greater than or equal to 60% by weight, and a total content of naphthenic compounds of less than or equal to 25% by weight, measured according to the ASTM D2140 method.

Preferably, the oil contains a total content of paraffinic compounds greater than or equal to 50%, preferably greater than or equal to 60% by weight, a total content of naphthenic compounds of less than or equal to 25% by weight, and a total content of aromatic compounds less than or equal to 25% by weight, measured according to the ASTM D2140 method.

For example, the oil has a total content of paraffinic compounds, measured according to the ASTM D2140 method, of between 50% and 90%, preferably between 60% and 80% by weight, and a total content of naphthenic compounds of between 5% and 25% by weight, and a total content of aromatic compounds of between 5% and 25% by weight.

Preferably, the oil has an aniline point, measured according to the standard ISO2977: 1997, of greater than or equal to 80° C., preferably greater than or equal to 90° C., for example greater than 100° C.

Preferably, the clear binder base preferably comprises (i) from 40% to 80% by weight of plasticizer, (ii) from 18% to 50% by weight of resin, (iii) from 1% to 7% by weight of copolymer; and (iv) optionally from 0.05% to 0.5% by weight of adhesion dopant, for example of amine, relative to the weight of clear binder base.

Advantageously, the clear binder base preferably comprises (i) from 40% to 80% by weight of plasticizer, (ii) from 18% to 50% by weight of resin, (iii) from 1% to 7% by weight of copolymer, and (iv) from 0.05% to 0.5% by weight of adhesion dopant, for example of amine, relative to the weight of clear binder base.

Advantageously, the clear binder base also comprises (i) from 45% to 70% by weight of plasticizer, (ii) from 25% to 50% by weight of resin, (iii) from 1% to 7% by weight of copolymer; and (iv) optionally from 0.1% and 0.3% by weight of adhesion dopant, relative to the total weight of clear binder base.

Preferably, the clear binder base consists essentially of (i) from 40% to 80% by weight of plasticizer, (ii) from 20% to 50% by weight of resin, (iii) from 1% to 7% by weight of copolymer, relative to the total weight of clear binder base.

Advantageously, the clear binder base essentially consists of (i) from 40% to 80% by weight of plasticizer, (ii) from 20% to 50% by weight of resin, (iii) from 1% to 7% by weight of copolymer and (iv) from 0.05% to 0.5% by weight of adhesion dopant, relative to the total weight of clear binder base.

Advantageously, the clear binder base essentially also consists of (i) from 45% to 70% by weight of plasticizer, (ii) from 25% to 50% by weight of resin, (iii) from 1% to 7% by weight of copolymer; and (iv) from 0.1% to 0.3% by weight of adhesion dopant, relative to the total weight of clear binder base.

Preferably, the copolymer is a copolymer based on styrene and butadiene units which comprises a weight content of 1,2-butadiene ranging from 5% to 70%.

Preferably, the copolymer is advantageously a copolymer based on styrene and butadiene units which comprises a weight content of 1,2-butadiene ranging from 5% to 70% and a weight content of 1,2-vinyl groups of between 10% and 40%.

For example, said copolymer based on styrene and butadiene units has a weight-average molecular weight of between 10 000 and 500 000, preferably between 50 000 and 200 000 and more preferentially between 50 000 and 150 000 daltons. Preferably, a styrene/butadiene block copolymer or styrene/butadiene/styrene block copolymer will be used.

The clear binders according to the invention are advantageously characterized in that they have a color index of less than or equal to 4, preferably less than or equal to 3, as determined according to the ASTM DH4 scale.

In addition, they may advantageously have a ring and ball softening point, determined according to the standard NF EN1427, of between 55° C. and 90° C.

Preferably, the clear binder that may be used according to the invention has a penetrability at 25° C., measured according to the standard NF EN 1426, of between 10 and 220 1/10 mm, preferably between 30 and 100 1/10 mm and more preferentially between 40 and 80 1/10 mm. Those skilled in the art can modulate the penetrability of the clear binder that may be used in the invention in particular by judiciously choosing the [structuring agent/plasticizer] weight ratio in the composition of the clear binder base. Indeed, it is known that an increase in this ratio makes it possible to reduce the penetrability at 25° C.

The clear binder bases used in the invention can be prepared, for example, according to the following process comprising the steps of:

(i) mixing the plasticizer, for example the DAO oil, and heating at a temperature of between 140 and 200° C., for example for from 10 minutes to 30 minutes, (ii) adding the structuring agent, for example the hydrocarbon-based resin, mixing and heating at a temperature of between 140 and 200° C., for example for from 30 minutes to 2 hours, (iii) adding the polymer(s), for example SBS, mixing and heating at a temperature of between 140 and 200° C., for example for from 90 minutes to 3 hours, preferably from 90 minutes to 2 hours 30 minutes, iv) optionally adding an adhesion dopant, mixing and heating at a temperature of between 140 and 200° C., for example for from 5 minutes to 20 minutes.

The order of steps (i) to (iv) can be modified.

According to one embodiment of the invention, the cores of the clear binder pellets also comprise at least one coloring agent as described above, for instance a pigment.

In these embodiments, the anticaking agent and/or the coloring agent will be chosen by those skilled in the art depending on the color of the desired clear binder.

The Pitch

According to the dictionary, the term "pitch" is intended to mean a residue from the distillation of tars from oil, from coal, from wood or from other organic molecules.

The invention relates herein to the residues from the distillation of oil, also known as "petroleum pitch".

For the purposes of the invention, use will be made, independently of each other, of the terms "pitch", "petroleum pitch" and "deasphalting pitch".

The pitches may be obtained via conventional manufacturing processes in a refinery. The manufacturing process corresponds to the sequence of an atmospheric distillation and of a vacuum distillation. In a first step, the crude oil is subjected to a distillation at atmospheric pressure, which results in a gas phase, different distillates and an atmospheric distillation residue being obtained. The residue from the atmospheric distillation is then itself subjected to a distillation under reduced pressure, known as vacuum distillation, which makes it possible to separate a heavy gas oil, various distillate fractions and a vacuum distillation residue. This vacuum distillation residue contains "petroleum pitch" in variable concentration.

It is possible to obtain the "oil pitch" according to two processes:

$1^{st}$ Process:

The vacuum distillation residue is subjected to a deasphalting operation by addition of an appropriate solvent, such as propane, which thus makes it possible to precipitate the pitch and to separate it from the light fractions, such as the deasphalted oil.

$2^{nd}$ Process:

The vacuum distillation residue is subjected to solvent extraction, more specifically with furfural. This heterocyclic aldehyde has the distinguishing feature of selectively dissolving aromatic and polycyclic compounds. This process thus makes it possible to remove the aromatic extracts and to recover the "oil pitch".

According to one embodiment, the pitch is an oxidized pitch.

Preferably, the oxidized pitch according to the invention is obtained by oxidation of a mixture comprising pitch and a diluent, such as a light gasoline, also known as "flux", subjected to an oxidation operation in a blowing tower in the presence of a catalyst, at a fixed temperature and at a given pressure.

For example, oxidized pitches may be manufactured in a blowing unit by passing a stream of air and/or oxygen through a starting pitch. This operation may be performed in the presence of an oxidation catalyst, for example phosphoric acid. Generally, the oxidation is carried out at high temperatures, of the order of 200 to 300° C., for relatively long periods of time typically of between 30 minutes and 2 hours, continuously or batchwise. The period of time and the temperature for oxidation are adjusted as a function of the properties targeted for the oxidized pitch and as a function of the quality of the starting pitch.

The mechanical qualities of the pitches are generally assessed by determining a series of mechanical characteristics by standardized tests, the most widely used of which are the needle penetrability, expressed in $^1/_{10}$ mm, and the softening point determined by the ring-and-ball test, also known as ring and ball softening point (RBSP).

According to one embodiment of the invention, the pitch exhibits a needle penetrability at 25° C. of 0 to 20$^1/_{10}$ mm, preferably of 0 to 15$^1/_{10}$ mm, more preferably of 0 to 10$^1/_{10}$ mm, it being understood that the penetrability is measured according to the standard EN 1426.

According to one embodiment of the invention, the pitch exhibits a softening point of between 115° C. and 175° C. Among examples of pitches used in the invention, there are pitches respectively exhibiting a softening point of between 115 and 125° C., between 135 and 145° C. or also between 165 and 175° C.

The Plasticizer

For the purposes of the invention, the term "plasticizer" is intended to mean a chemical constituent for fluidizing and reducing the viscosity and the modulus of the binder obtained.

In one embodiment of the invention, the plasticizer is chosen from oils of petroleum origin, oils of plant origin and mixtures thereof.

In one preferred embodiment of the invention, the oils of plant origin are chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof.

Preferably, the oils of plant origin are chosen from rapeseed, sunflower, linseed, coconut and soybean oils, and mixtures thereof.

In one preferred embodiment of the invention, the oils of petroleum origin are chosen from aromatic oils and oils of synthetic origin.

Preferably, the aromatic oils comprise aromatic extracts of petroleum residues, obtained by extraction or dearomatization of residues from distillation of petroleum fractions.

More preferably, the aromatic oils have a content of aromatic compounds of between 30% and 95% by weight, advantageously between 50% and 90% by weight, more advantageously between 60% and 85% by weight (SARA: Saturates/Aromatics/Resins/Asphaltenes method).

More preferably, the aromatic oils have a content of saturated compounds of between 1% and 20% by weight, advantageously of between 3% and 15% by weight, more advantageously of between 5% and 10% by weight (SARA: Saturates/Aromatics/Resins/Asphaltenes method).

More preferably, the aromatic oils have a content of resin-based compounds of between 1% and 10% by weight, advantageously of between 3% and 5% by weight (SARA: Saturates/Aromatics/Resins/Asphaltenes method).

In one preferred embodiment of the invention, the oils of synthetic origin result from the deasphalting fractions from the distillation under reduced pressure (vacuum residue VR) of crude oil (hereinafter denoted "DAO oil").

In particular, in one preferred embodiment, the plasticizer consists solely of a DAO oil.

The contents of paraffinic, naphthenic and aromatic compounds mentioned in the present patent application are determined according to the standard ASTM D2140, as weight percentages relative to the weight of the oil.

In a specific embodiment, the plasticizer is an oil, for example a DAO oil, having a total content of paraffinic compounds of at least 50% by weight, preferably of at least 60% by weight, for example of between 50% and 90%, preferably between 60% and 90%, more preferentially between 50% and 80% and in particular of between 55% and 70% or in particular of between 60% and 75%.

In a more specific embodiment, the plasticizer is an oil, for example a DAO oil, also having a total content of naphthenic compounds which does not exceed 25%, for example between 5% and 25% and in particular between 10% and 25%.

In a more specific embodiment, the plasticizer is an oil, for example a DAO oil, also having a total content of aromatic compounds which does not exceed 25%, for example between 5% and 25% and in particular between 8% and 18%.

In one particularly preferred embodiment, the plasticizer is an oil, for example a DAO oil, comprising the respective contents:
(i) a total content of paraffinic compounds of between 50% and 90%;
(ii) a total content of naphthenic compounds of between 5% and 25%, for example between 15% and 25%; and
(iii) a total content of aromatic compounds of between 5% and 25%, for example between 10% and 15%.

In a more particularly preferred embodiment, the plasticizer is an oil, for example a DAO oil, comprising the respective contents:
(i) a total content of paraffinic compounds of between 60% and 75%;
(ii) a total content of naphthenic compounds of between 5% and 25%, for example between 15% and 25%; and
(iii) a total content of aromatic compounds of between 5% and 25%, for example between 10% and 15%.

Oils corresponding to the characteristics above and that can be used for the preparation of the clear binder according to the invention are obtained by the processes for the deasphalting of the vacuum residues (VRs) resulting from the refining of oil, for example by a deasphalting using a $C_3$ to $C_6$ solvent, preferably with propane. These deasphalting processes are well known to those skilled in the art and are described, for example, in Lee et al., 2014, Fuel Processing Technology, 119: 204-210. The residues resulting from the vacuum distillation (VRs) are separated according to their molecular weight in the presence of $C_3$ to $C_6$ solvent (for example propane). The "DAO" oil (deasphalted oil) thus obtained is rich in paraffin, exhibits a very low content of asphaltenes, has an evaporation temperature of between 440° C. and 750° C. and has a much greater API gravity than that of the vacuum residues.

The respective contents of paraffinic, naphthenic and aromatic compounds depend to a certain extent on the nature of the crude oil which is the source of the DAO oil and on the refining process used. Those skilled in the art know how to determine the respective contents of paraffinic, naphthenic and aromatic compounds of a DAO oil, for example using the SARA fractionation method, also described in Lee et al., 2014, Fuel Processing Technology, 119, 204-210, and to thus select the DAO oil appropriate for the preparation of the clear binder according to the invention.

In one embodiment, the amount of plasticizer used in the process for preparing the clear binder base is from 40% to 80%, preferably from 45% to 70% by weight, relative to the total weight of the clear binder base.

The Structuring Agent

The term "structuring agent" is intended to mean any chemical constituent imparting mechanical properties and satisfactory cohesiveness to said binder.

The structuring agent used in the context of the invention is a resin, preferably chosen from resins of hydrocarbon-based petroleum origin, for example derived from the copolymerization of aromatic, aliphatic and cyclopentadienic petroleum fractions, taken alone or as a mixture, preferably derived from aromatic petroleum fractions. For example, it may be a polycycloaliphatic thermoplastic resin, for example of the low molecular weight hydrogenated cyclopentadiene homopolymer type.

More particularly, the hydrocarbon resin of the cyclopentane type has a softening point (or ring and ball softening point, RBSP, according to the standard NF T 66-008) of greater than 125° C., and a Gardner color index (according to the standard NF T 20-030) equal to at most 1.

Other examples of resins that may be used as structuring agent include, without being limiting, resins of plant origin obtained from vegetables and/or plants. They may be "harvest", i.e. harvested from the living plant. They may be used as they are, and are then referred to as natural resins, or they may be chemically converted, and are then referred to as modified natural resins.

Among the harvest resins are acaroid resins, dammar, natural rosins, modified rosins, rosin esters and metal resinates. These may be taken alone or as a mixture.

Among the natural rosins, mention may be made of gum and wood rosins, in particular pine rosin, and/or tall oil rosin. These natural rosins may be taken alone or as a mixture.

Among the modified rosins, mention may be made of hydrogenated rosins, disproportionated rosins, polymerized rosins and/or maleinized rosins. These modified natural rosins may be taken alone or as a mixture, and may undergo one or more disproportionation, polymerization and/or maleinization treatments.

Among the rosin esters, mention may be made of methyl esters of natural rosins, methyl esters of hydrogenated rosins, esters of glycerol and of natural rosins, esters of glycerol and hydrogenated rosins, esters of glycerol and of disproportionated rosins, esters of glycerol and of polymerized rosins, esters of glycerol and of maleinized rosins, esters of pentaerythritol and of natural rosins and esters of pentaerythritol and of hydrogenated rosins. These rosin esters can be taken alone or as a mixture and come from rosins having undergone one or more disproportionation, polymerization and/or maleinization treatments.

Esters of pentaerythritol and of natural rosins and esters of pentaerythritol and of hydrogenated rosins are the preferred rosin esters.

Among the metal resinates, mention may be made of metal carboxylates, for example of Ca, Zn, Mg, Ba, Pb or Co, obtained from natural rosins or from modified rosins. Calcium resinates, zinc resinates, mixed calcium/zinc resinates, taken alone or as a mixture, are preferred.

The weight ratio between the structuring agent and the plasticizer used for the preparation of the clear binder is generally from 0.3 to 1.5, for example from 0.5 to 1.

In one specific embodiment, the amount of structuring agent used in the process for preparing the clear binder base is from 25% to 50% by weight relative to the total weight of clear binder base.

The Polymer

The polymer used in the first composition is a copolymer based on conjugated diene units and monovinyl aromatic hydrocarbon units. The conjugated diene is preferably chosen from those comprising from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof.

The monovinyl aromatic hydrocarbon is preferably chosen from styrene, o-methylstyrene, p-methylstyrene, p-tertbutylstyrene, 2,3-dimethylstyrene, vinylnaphthalene, vinyltoluene, vinylxylene, and the like or mixtures thereof, in particular styrene.

More particularly, the polymer consists of one or more copolymers chosen from block copolymers of styrene and butadiene, of styrene and isoprene, of styrene and chloroprene, of styrene and carboxylated butadiene or of styrene and carboxylated isoprene. A preferred copolymer is a copolymer based on butadiene units and styrene units such as the SB styrene/butadiene block copolymer or the SBS styrene/butadiene/styrene block copolymer.

The styrene/conjugated diene copolymer, in particular the styrene/butadiene copolymer, advantageously has a weight content of styrene ranging from 5% to 50%, preferably from 20% to 50%.

The styrene/conjugated diene copolymer, in particular the styrene/butadiene copolymer, advantageously has a weight content of butadiene (1,2- and 1,4-) ranging from 50% to 95%. The styrene/conjugated diene copolymer, in particular the styrene/butadiene copolymer, advantageously has a content by weight of 1,2-butadiene ranging from 5% to 70%, preferably from 5% to 50%. The 1,2-butadiene units are the units which result from polymerization via the 1,2 addition of butadiene units.

The weight-average molecular weight of the styrene/conjugated diene copolymer, and in particular that of the styrene/butadiene copolymer, may be, for example, between 10 000 and 500 000, preferably between 50 000 and 200 000 and more preferentially from 50 000 to 150 000 daltons.

In one specific embodiment, the total amount of polymer used in the process of the invention is from 0.5% to 20% by weight, preferably from 1% to 10%, preferably from 1% to 7% by weight, for example from 2% to 5%, relative to the total weight of bitumen base, or of clear binder.

In another specific embodiment, the total amount of polymer used in the process of the invention is from 20% to 50% by weight, relative to the total weight of bitumen base or relative to the total weight of clear binder base.

In this case, the first composition is referred to as the stock solution of bitumen/polymer composition or stock solution of clear binder/polymer composition. It is intended to be transported and stored in concentrated form, and then diluted with the desired amount of bitumen base or of clear binder base just before its use as a road binder or as coating binder. According to the invention, it is possible to form pellets of stock solution of bitumen or of clear binder, so as to facilitate their transportation and storage and also their handling at a high ambient temperature.

According to one variant of the invention, the polymer is chosen from micronized polymers. Preferably, according to this variant, the polymer has particles with a diameter ranging from 250 to 1000 μm, preferably with a diameter ranging from 400 to 600 μm.

Compatibilizer

Preferably, the compatibilizer is chosen from waxes, for example animal waxes, plant waxes and mineral waxes, and mixtures thereof.

Animal and plant waxes are mainly composed of mixtures of fatty acid derivatives (fatty acid esters), whereas mineral waxes are paraffin derivatives.

The Adhesion Dopants

To improve the reciprocal affinity between the binder and the aggregates and to ensure the longevity, adhesion dopants may also be used in the first composition, as a mixture with the other components, especially the clear binder, or the bitumen base or the pitch. These are, for example, nitrogen-containing surfactant compounds derived from fatty acids (amines, polyamines, alkylpolymanne, etc.).

When they are added to the first composition, the adhesion dopants generally represent between 0.05% and 0.5% by weight relative to the weight of clear binder or of bitumen base or of pitch. For example, in a specific embodiment, 0.05% to 0.5% of amine, preferably 0.1% to 0.3% of amine, relative to the total weight of clear binder base or of bitumen base or of pitch, will be added.

The Coloring Agents

The synthetic clear binder may also include one or more coloring agents, such as mineral pigments or organic dyes. The pigments are selected according to the shade and the color desired for the coating. For example, metal oxides such as iron oxides, chromium oxides, cobalt oxides or titanium oxides will be used to obtain the colors red, yellow, gray, blue-green or white. The pigments can be added either to the clear binder or to the bituminous mix (mixture with the aggregates for example) or to an emulsion of the clear binder.

The Chemical Additive

The bitumen base, the pitch or the clear binder may also comprise at least one chemical additive chosen from: an organic compound, a paraffin, a polyphosphoric acid and mixtures thereof.

In particular, when the solid material comprises at least one chemical additive, it is in a suitable amount so that its penetrability is preferably from 5 to 50 1/10 mm, and/or so that the ring and ball softening point (RBSP) is preferably greater than or equal to 60° C., it being understood that the penetrability is measured at 25° C. according to the standard EN 1426 and the RBSP is measured according to the standard EN 1427.

According to a first embodiment of the invention, the chemical additive is an organic compound. Advantageously, the organic compound has a molar mass of less than or equal to 2000 g·mol$^{-1}$, preferably a molar mass of less than or equal to 1000 g·mol$^{-1}$.

In this first embodiment, according to a first variant, the organic compound is a compound of general formula (I):

wherein:
Ar1 and Ar2 represent, independently of one another, a benzene nucleus or a system of condensed aromatic nuclei of 6 to 20 carbon atoms which are substituted with at least one hydroxyl group, and
R represents an optionally substituted divalent radical, the main chain of which comprises from 6 to 20 carbon atoms and at least one group chosen from the amide, ester, hydrazide, urea, carbamate and anhydride functions.

Preferably, Ar1 and/or Ar2 are substituted with at least one alkyl group of 1 to 10 carbon atoms, advantageously in one or more ortho positions with respect to the hydroxyl group(s); more preferably, Ar1 and Ar2 are 3,5-dialkyl-4-hydroxyphenyl groups, advantageously 3,5-di(tert-butyl)-4-hydroxyphenyl groups.

Preferably, R is in the para position relative to a hydroxyl group of Ar1 and/or Ar2.

Advantageously, the compound of formula (I) is 2',3-bis[(3-[3,5-di(tert-butyl)-4-hydroxyphenyl]propionyl)]propionohydrazide.

According to a second variant of this first embodiment, the organic compound is a compound of general formula (II):

wherein:
the R' and R" groups, which may be identical or different, represent a saturated or unsaturated and linear, branched or cyclic hydrocarbon-based chain comprising from 1 to 22 carbon atoms which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S, and R" may be H;

the X group represents a saturated or unsaturated and linear, cyclic or branched hydrocarbon-based chain comprising from 1 to 22 carbon atoms which is optionally substituted and which optionally comprises heteroatoms, such as N, O or S, $C_5$-$C_{24}$ hydrocarbon-based rings and/or $C_4$-$C_{24}$ hydrocarbon-based heterocycles comprising one or more heteroatoms, such as N, O or S;

n, m and p are integers having a value of 0 or 1, independently of one another.

According to this variant, when the integer m has a value of 0, and when the integer p has a value of 1, then the R'—$(NH)_n$CONH and NHCO$(NH)_n$—R" groups are covalently bonded by a hydrazide bond CONH—NHCO. The R' group or the R" group then comprises at least one group chosen from: a hydrocarbon-based chain of at least 4 carbon atoms, an aliphatic ring of 3 to 8 atoms and a condensed aliphatic, partially aromatic or completely aromatic polycyclic system, each ring comprising 5 or 6 atoms.

Still according to this variant, when the integer m has a value of 1, then the group R', the group R" and/or the group X comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Preferably, the R' and/or R" group comprises an aliphatic hydrocarbon-based chain of 4 to 22 carbon atoms, in particular chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from $C_2H_4$ and $C_3H_6$ groups.

Preferably, the X group can also be a cyclohexyl group or a phenyl group; the R'—$(NH)_n$CONH— and —NHCO$(NH)_n$—R" radicals can then be in the ortho, meta or para position. Moreover, the R'—$(NH)_n$CONH— and —NHCO$(NH)_n$—R" radicals can be in the cis or trans position with respect to one another. Furthermore, when the X radical is cyclic, this ring can be substituted with groups other than the two main groups R'—$(NH)_n$CONH— and —NHCO$(NH)_n$—R".

Preferably, the group X comprises two rings of 6 carbons bonded via a $CH_2$ group, these rings being aliphatic or aromatic. In this case, the X group is a group comprising two aliphatic rings connected by an optionally substituted $CH_2$ group, such as for example:

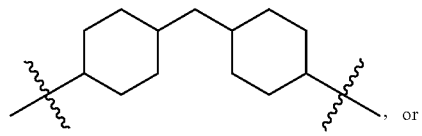, or

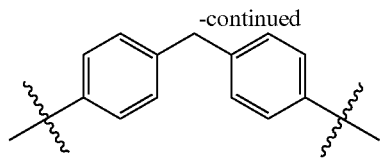

Advantageously, according to this variant, the organic compound is a compound of general formula (II) chosen from:

hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$;

diamides such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$;

monoamides such as laurylamide of formula $C_{11}H_{23}$—$CONH_2$, myristylamide of formula $C_{13}H_{27}$—$CONH_2$, palmitamide of formula $C_{15}H_{31}$—$CONH_2$, stearamide of formula $C_{17}H_{35}$—$CONH_2$;

ureide derivatives such as 4,4'-bis(dodecylaminocarbonylamino)diphenylmethane of formula $C_{12}H_{25}$—NHCONH—$C_6H_4$—$CH_2$—$C_6H_4$—NHCONH—$C_{12}H_{25}$.

Preferably, the compound of general formula (II) is chosen from those which satisfy the condition n=0.

Preferably, the compound of general formula (II) is chosen from those which satisfy the condition: the sum of the numbers of carbon atoms of R', X and R" is greater than or equal to 10, advantageously greater than or equal to 14, preferably greater than or equal to 18.

Preferably, the compound of general formula (II) is chosen from those which satisfy the condition: the number of carbon atoms of at least one from among R' and R" is greater than or equal to 10, advantageously greater than or equal to 12, preferably greater than or equal to 14.

Preferably, according to a first variant, the compound of general formula (II) is chosen from those of formula (IIA):

$$R'—CONH—(X)_m—NHCO—R" \qquad (IIA)$$

wherein R', R", m and X have the same definition as above.

Preferably, in the formula (IIA), when m=1, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the X group is chosen from the $C_2H_4$ and $C_3H_6$ groups.

Preferably, the compound of general formula (IIA) is chosen from those which satisfy the condition: the sum of the numbers of the carbon atoms of R', X and R" is greater than or equal to 10, advantageously greater than or equal to 14, preferably greater than or equal to 18.

Preferably, the compound of general formula (IIA) is chosen from those which satisfy the condition: the number of carbon atoms of at least one from among R' and R" is greater than or equal to 10, advantageously greater than or equal to 12, preferably greater than or equal to 14.

More preferentially, according to this variant, the compound of general formula (IIA) is chosen from hydrazide derivatives, such as the compounds $C_5H_{11}$—CONH—NHCO—$O_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second variant, the compound of general formula (II) is chosen from those of formula (IIB):

R'—CONH—R"  (IIB)

wherein R' and R" have the same definition as above.

Advantageously, according to this variant, the sum of the numbers of carbon atoms of R' and R" is greater than or equal to 10, advantageously greater than or equal to 14, preferably greater than or equal to 18.

Even more advantageously, according to this variant, the number of carbon atoms of R' is greater than or equal to 10, advantageously greater than or equal to 12, preferably greater than or equal to 14, and R"=H.

Advantageously, the compound of general formula (II) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (II) is N,N'-ethylenedi(stearamide) of formula $C_{17}H_{35}$—CONH—$CH_2$—$CH_2$—NHCO—$C_{17}H_{35}$.

Preferably, when the chemical additive is chosen from the organic compounds of formula (II), it is used in combination with at least one other chemical additive chosen from the organic compounds of formulae (I), (III), (V), (VI) and (VII) and/or the reaction products of at least one $C_3$-$C_{12}$ polyol and of at least one $C_2$-$C_{12}$ aldehyde, in particular those comprising a group of formula (IV).

According to a third variant of this embodiment, the organic compound is a compound of formula (III):

(R—NHCO)$_x$—Z—(NHCO—R')$_y$  (III), wherein:
R and R', which may be identical or different, contain a saturated or unsaturated, linear, branched or cyclic hydrocarbon-based chain comprising from 1 to 22 carbon atoms, which is optionally substituted, and which optionally comprises heteroatoms, rings and/or heterocycles;

Z represents a trifunctionalized group chosen from the following groups:

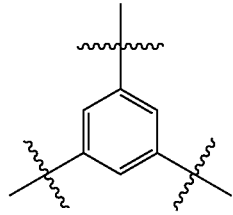
$Z_1$

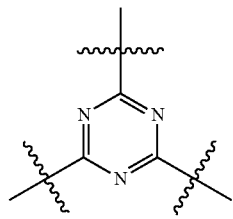
$Z_2$

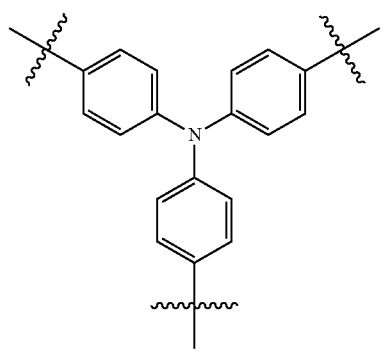
$Z_3$ x and y are different integers with a value ranging from 0 to 3, and such that x+y=3.

Preferably, when x is equal to 0 and Z represents $Z_2$, the compound of formula (III) is N2,N4,N6-tridecylmelamine having the following formula, with R' representing the $C_9H_{19}$ group:

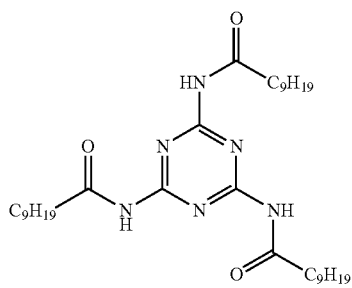

Other preferred compounds corresponding to the formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to the formula (III) are such that: y is equal to 0 and Z represents $Z_1$; the compounds then have the formula:

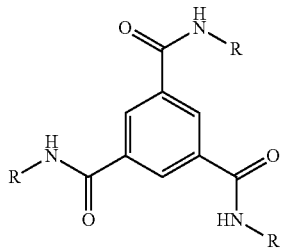

with R chosen from the following groups, taken alone or as mixtures:

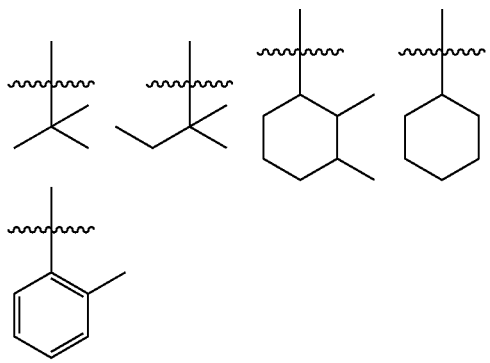

Other preferred compounds corresponding to the formula (III) are such that: y is equal to 0, Z represents $Z_1$ and R represents a saturated linear hydrocarbon-based chain of 1 to 22 carbon atoms, preferably of 8 to 12 carbon atoms.

According to a fourth variant of this embodiment, the organic compound is a reaction product of at least one $C_3$-$C_{12}$ polyol and at least one $C_2$-$C_{12}$ aldehyde. Among the polyols that may be used, mention may be made of sorbitol, xylitol, mannitol and/or ribitol. Preferably, the polyol is sorbitol.

Advantageously, according to this variant, the organic compound is a compound which comprises at least one function of general formula (IV):

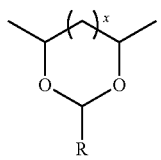

(IV)

wherein:
x is an integer,
R is chosen from a $C_1$-$C_{11}$ alkyl, alkenyl, aryl or aralkyl radical, optionally substituted with one or more halogen atoms, or one or more $C_1$-$C_6$ alkoxy groups.

The organic compound is advantageously a sorbitol derivative. The term "sorbitol derivative" is intended to mean any reaction product obtained from sorbitol, in particular any reaction product obtained by reacting an aldehyde with D-sorbitol. Sorbitol acetals, which are sorbitol derivatives, are obtained via this condensation reaction. 1,3:2,4-Di-O-benzylidene-D-sorbitol is obtained by reacting 1 mol of D-sorbitol and 2 mol of benzaldehyde and has the formula:

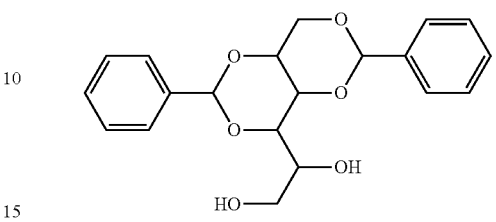

The sorbitol derivatives can thus be all the condensation products of aldehydes, in particular of aromatic aldehydes, with sorbitol. Sorbitol derivatives having the general formula below will then be obtained:

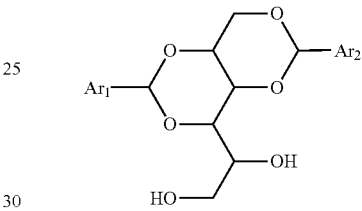

wherein $Ar_1$ and $Ar_2$ are optionally substituted aromatic nuclei.

Among the sorbitol derivatives, other than 1,3:2,4-di-O-benzylidene-D-sorbitol, are, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene)sorbitol, 1,3:2,4-bis(p-butylbenzylidene)sorbitol, 1,3:2,4-bis(p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol and 1,3:2,4-di-O-(4,3-dimethylbenzylidene)-D-sorbitol. Preferably, according to this variant, the organic compound is 1,3:2,4-di-O-benzylidene-D-sorbitol.

According to a fifth variant of this embodiment, the organic compound is a compound of general formula (V):

R"—(COOH)$_z$ (V), wherein R" represents a linear or branched and saturated or unsaturated chain comprising from 4 to 68 carbon atoms, preferably from 4 to 54 carbon atoms, more preferably from 4 to 36 carbon atoms, and z is an integer varying from 2 to 4.

Preferably, the R" group is preferably a saturated linear chain of formula $C_wH_{2w}$, with w being an integer varying from 4 to 22, preferably from 4 to 12.

According to this variant of the invention, the organic compounds corresponding to the formula (V) can be diacids (z=2), triacids (z=3) or tetracids (z=4). The preferred organic compounds according to this variant are diacids with z=2.

Preferably, the diacids have the general formula HOOC—$C_wH_{2w}$—COOH with w being an integer ranging from 4 to 22, preferably from 4 to 12 and wherein z=2 and R''=$C_wH_{2w}$.

Advantageously, according to this variant, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, the diacid is sebacic acid.

The diacids can also be diacid dimers of unsaturated fatty acid(s), that is to say dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels-Alder reaction, for example). Preferably, a single type of unsaturated fatty acid is dimerized. They are derived in particular from the dimerization of an unsaturated fatty acid, in particular a $C_8$ to $C_{34}$, in particular $C_{12}$ to $C_{22}$, especially $C_{16}$ to $C_{20}$ and more particularly $C_{18}$ unsaturated fatty acid. A preferred fatty acid dimer is obtained by dimerization of linoleic acid, it being possible for the dimer to be subsequently partially or completely hydrogenated. Another preferred fatty acid dimer has the formula HOOC—$(CH_2)_7$—CH═CH—$(CH_2)_7$—COOH. Another preferred fatty acid dimer is obtained by dimerization of methyl linoleate. In the same way, it is possible to find triacids of fatty acids and tetracids of fatty acids, obtained respectively by trimerization and tetramerization of at least one fatty acid.

According to a sixth variant of this embodiment, the organic compound is a compound of general formula (VI):

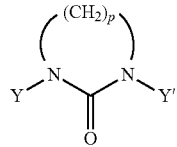

(VI)

wherein:
the Y and Y' groups represent, independently of one another, an atom or group chosen from: H, —$(CH_2)_q$—$CH_3$, —$(CH_2)_q$—$NH_2$, —$(CH_2)_q$—OH, —$(CH_2)_q$—COOH or

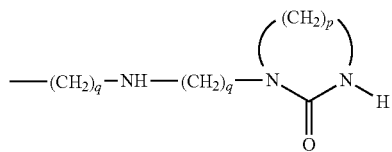

with q being an integer ranging from 2 to 18, preferably from 2 to 10, preferably from 2 to 4 and p being an integer greater than or equal to 2, preferably having a value of 2 or 3.

Among the preferred organic compounds corresponding to formula (VI), mention may be made of the following compounds:

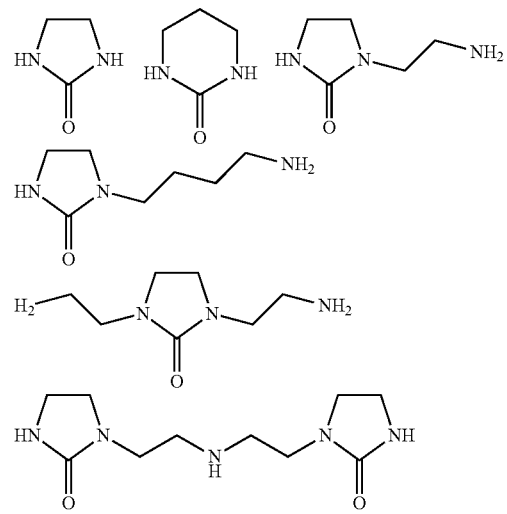

Preferably, according to this variant, the organic compound of general formula (VI) is:

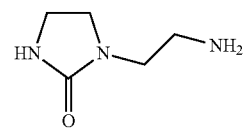

According to a seventh variant of this embodiment, the organic compound is a compound of general formula (VII):

R—NH—CO—CO—NH—R' (VII)

wherein R and R', which may be identical or different, represent a saturated or unsaturated, linear, branched or cyclic hydrocarbon-based chain comprising from 1 to 22 carbon atoms, preferably from 8 to 12 carbon atoms, which is optionally substituted, and which optionally comprises heteroatoms, rings and/or heterocycles.

According to another embodiment of the invention, the chemical additive is a paraffin. The paraffins have chain lengths of 30 to 120 carbon atoms ($C_{30}$ to $C_{120}$). The paraffins are advantageously chosen from polyalkylenes. Preferably, polymethylene paraffins and polyethylene paraffins will be used according to the invention. These paraffins may be of petroleum origin or come from the chemical industry. Advantageously, the paraffins used are synthetic paraffins derived from the conversion of biomass and/or natural gas.

Preferably, these paraffins contain a large proportion of "normal" paraffins, i.e. linear, straight-chain, unbranched paraffins (saturated hydrocarbons). Thus, the paraffins may comprise from 50% to 100% of normal paraffins and from 0 to 50% of isoparaffins and/or of branched paraffins. More preferentially, the paraffins comprise from 85% to 95% of normal paraffins and from 5% to 15% of isoparaffins and/or of branched paraffins. Advantageously, the paraffins comprise from 50% to 100% of normal paraffins and from 0 to 50% of isoparaffins. Even more advantageously, the paraffins comprise from 85% to 95% of normal paraffins and from 5% to 15% of isoparaffins.

Preferably, the paraffins are polymethylene paraffins. More particularly, the paraffins are synthetic polymethylene paraffins, for example paraffins derived from the conversion of synthesis gas via the Fischer-Tropsch process. In the Fischer-Tropsch process, paraffins are obtained by reaction of hydrogen with carbon monoxide on a metal catalyst. Fischer-Tropsch synthesis processes are described for example in the publications EP 1 432 778, EP 1 328 607 or EP 0 199 475.

According to another embodiment of the invention, the chemical additive is a polyphosphoric acid. The polyphosphoric acids (PPAs) that can be used in the invention are described in WO 97/14753. These are compounds of empirical formula $P_qH_rO_s$ wherein q, r and s are positive numbers such that:

q≥2 and in particular q is from 3 to 20 or more and that q+r−2 s=0.

In particular, said polyphosphoric acids can be linear compounds of empirical formula $P_qH_{(q+2)}O_{(3q+1)}$ corresponding to the structural formula:

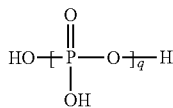

wherein q has the definition given above. They may also be products of two-dimensional or three-dimensional structure.

All these polyphosphoric acids can be considered as products of polycondensation by heating aqueous metaphosphoric acid.

The combining of several different chemical additives, such as various organic compounds of formulae (I), (II), (III), (V), (VI) and (VII), the products of reaction of at least one $C_3$-$C_{12}$ polyol and at least one $C_2$-$C_{12}$ aldehyde, in particular those comprising a group of formula (IV), and/or various paraffins and/or various polyphosphoric acids, in the material that can be used as a road binder or as a sealing binder, will not be a departure from the context of the invention.

Advantageously, when a chemical additive is used in the material that can be used as a road binder or as a sealing binder, it is chosen from the compounds of formula (I), the compounds of formula (II), the compounds of formula (V) and mixtures of these compounds.

Even more advantageously, when a chemical additive is used in the material that can be used as a road binder or as a sealing binder, it is chosen from:
2′,3-bis[(3-[3,5-di-tert-butyl-4-hydroxyphenyl]propionyl] propionohydrazide,
sebacic acid,
hydrazide derivatives such as: $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$;
diamides such as N,N′-ethylenedi(laurylamide) of formula $C_{11}H_{23}$—CONH—$CH_2$—$CH_2$—NHCO—$C_{11}H_{31}$, N,N′-ethylenedi(myristylamide) of formula $C_{13}H_{27}$—CONH—$CH_2$—$CH_2$—NHCO—$C_{13}H_{27}$, N,N′-ethylenedi(palmitamide) of formula $C_{15}H_{31}$—CONH—$CH_2$—$CH_2$—NHCO—$C_{15}H_{31}$, N,N′-ethylenedi(stearamide) of formula $C_{17}H_{35}$—CONH—$CH_2$—$CH_2$—NHCO—$C_{17}H_{35}$;
monoamides such as laurylamide of formula $C_{11}H_{23}$—$CONH_2$, myristylamide of formula $C_{13}H_{27}$—$CONH_2$, palmitamide of formula $C_{15}H_{31}$—$CONH_2$, stearamide of formula $C_{17}H_{35}$—$CONH_2$,
and mixtures of these compounds.

More advantageously, when a chemical additive is used in the material that can be used as a road binder or as a sealing binder, it is chosen from:
2′,3-bis[(3-[3,5-di-tert-butyl-4-hydroxyphenyl]propionyl)]propionohydrazide,
sebacic acid,
and mixtures of these compounds.

According to another preferred embodiment, when a chemical additive is used in the material that can be used as a road binder or as a sealing binder, it is chosen from:
diamides such as N,N′-ethylenedi(laurylamide) of formula $C_{11}H_{23}$—CONH—$CH_2$—$CH_2$—NHCO—$C_{11}H_{31}$, N,N′-ethylenedi(myristylamide) of formula $C_{13}H_{27}$—CONH—$CH_2$—$CH_2$—NHCO—$C_{13}H_{27}$, N,N′-ethylenedi(palmitamide) of formula $C_{15}H_{31}$—CONH—$CH_2$—$CH_2$—NHCO—$C_{15}H_{31}$, N,N′-ethylenedi(stearamide) of formula $C_{17}H_{35}$—CONH—$CH_2$—$CH_2$—NHCO—$C_{17}H_{35}$;
sebacic acid,
and mixtures of these compounds.

According to one embodiment of the invention, the first composition, comprising for example the bitumen base, of which the core of the pellets is composed, comprises from 0.1% to 10% by weight, preferably from 0.5% to 5% by weight and more preferentially from 0.5% to 2.5% by weight of chemical additive relative to the total weight of said first composition.

According to an advantageous embodiment, the first composition comprises at least two chemical additives.

According to a first variant of this embodiment, the first composition comprises at least one first chemical additive of formula (V) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this variant, the first composition comprises at least one first chemical additive of formula (V) and at least one second chemical additive of formula (II).

More preferentially, and according to this first variant, the first composition comprises at least one first additive of formula (V) and at least one second chemical additive of formula (IIA).

Preferably, and still according to this first variant, the first chemical additive of formula (V) is chosen from diacids (z=2), triacids (z=3) and tetracids (z=4), preferably from diacids (z=2).

More preferentially, and still according to this first variant, the first chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first variant, the first chemical additive of formula (V) is sebacic acid or 1,10-decanedioic acid with w=8.

According to a second variant of this embodiment, the first composition comprises at least one first chemical additive of formula (II) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this second variant, the first chemical additive of formula (II) is chosen from the chemical additives of formula (IIA).

More preferentially, and according to this second variant, the first composition comprises at least one first chemical additive of formula (IIA) and at least one second chemical additive chosen from: the chemical additives of formula (I); the chemical additives of formula (IIB); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Even more preferentially, and according to this second variant, the first composition comprises at least one first additive of formula (IIA) and at least one second chemical additive of formula (V).

Advantageously, and according to this second variant, the first chemical additive of formula (II) is N,N'-ethylenedi(stearamide).

Preferably, and according to this second variant, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

According to a third preferred variant of this embodiment, the first composition comprises at least sebacic acid or 1,10-decanedioic acid and at least N,N'-ethylenedi(stearamide).

According to a fourth variant of this embodiment, the first composition comprises at least one first additive of formula (I) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this fourth variant, the second chemical additive is chosen from the chemical additives of formula (II) and the chemical additives of formula (V).

Preferably, and according to this fourth variant, the second chemical additive of formula (II) is chosen from the chemical additives of formula (IIA).

More preferably, and according to this fourth variant, the second chemical additive of formula (II) is N,N'-ethylenedi(stearamide).

Preferably, and still according to this fourth variant, the second chemical additive of formula (V) is chosen from diacids (z=2), triacids (z=3) and tetracids (z=4), preferably from diacids (z=2).

Even more preferentially, and still according to this fourth variant, the second chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and still according to this fourth variant, the second chemical additive of formula (V) is sebacic acid or 1,10-decanedioic acid.

Preferably, and according to this fourth variant, the first chemical additive of formula (I) is 2',3-bis[(3-[3,5-di(tert-butyl)-4-hydroxyphenyl]propionyl)]propionohydrazide.

Preferably, and according to this embodiment, the weight ratio of the first chemical additive relative to the second chemical additive is from 1:99 to 99:1, preferably from 1:9 to 9:1, even more preferentially from 1:5 to 5:1.

Olefinic Polymer Adjuvant

According to one embodiment of the invention, the first composition may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously chosen from random or block, preferably random, terpolymers of ethylene, of a monomer A and of a monomer B.

Monomer A is chosen from vinyl acetate and $C_1$ to $C_6$ alkyl acrylates or methacrylates.

Monomer B is chosen from glycidyl acrylate and glycidyl methacrylate.

The ethylene/monomer A/monomer B terpolymers comprise from 0.5% to 40% by weight, preferably from 5% to 35% by weight and more preferentially from 10% to 30% by weight of units derived from monomer A, and from 0.5% to 15% by weight and preferably from 2.5% to 15% by weight of units derived from monomer B, the remainder being formed from units derived from ethylene.

(c) The copolymers result from the grafting of a monomer B, chosen from glycidyl acrylate and glycidyl methacrylate, to a polymer substrate. The polymer substrate consists of a polymer chosen from polyethylenes, especially low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by weight and preferably from 50% to 99% by weight of ethylene. Said grafted copolymers comprise from 0.5% to 15% by weight and preferably from 2.5% to 15% by weight of grafted units derived from monomer B.

Advantageously, the olefinic polymer adjuvant is chosen from random terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by weight, preferably from 5% to 35% by weight, more preferably from 10% to 30% by weight, of units resulting from the monomer A and from 0.5% to 15% by weight, preferably from 2.5% to 15% by weight, of units resulting from the monomer B, the remainder being formed of units resulting from ethylene.

According to one embodiment of the invention, the first composition, comprising for example a bitumen base, of which the core of the pellets is composed, comprises from 0.05% to 15% by weight, preferably from 0.1% to 10% by weight and more preferentially from 0.5% to 6% by weight of olefinic polymer adjuvant relative to the total weight of the first composition.

According to one embodiment of the invention, the first composition may also comprise other known additives or other known elastomers for bitumen, such as SB (copolymer comprising blocks of styrene and butadiene), SBS (styrene/butadiene/styrene block copolymer), SIS (styrene/isoprene/styrene), SBS* (styrene/butadiene/styrene star block copolymer), SBR (styrene-b-butadiene rubber) or EPDM (ethylene/propylene/diene-modified) copolymers. These elastomers may also be crosslinked according to any known process, for example with sulfur. Mention may also be made of elastomers prepared from styrene monomers and butadiene monomers allowing crosslinking without a crosslinking agent, as described in WO 2007/058994 and WO 2008/137394 and by the applicant in patent application WO 11/013073.

According to one preferred particular embodiment, the first composition comprises a combination of the chemical additive of formula (II) and the olefinic polymer adjuvant described above.

The combination in which the chemical additive is of formula (II) wherein m=0, more preferentially wherein m=0 and n=0, will be preferred.

The combination in which the olefinic polymer adjuvant is chosen from the ethylene/monomer A/monomer B terpolymers described above will also be preferred.

More preferably, the first composition, for example the road bitumen, comprises the chemical additive of formula (II) where m=0, more preferably where m=0 and n=0, and the olefinic polymer adjuvant chosen from the ethylene/monomer A/monomer B terpolymers (b) described above.

The Coating Layer/Second Composition:

According to the invention, the coating layer is obtained by applying a composition comprising:
  at least one viscosifying compound chosen from cellulose ethers, and
  at least one anticaking agent
to all or part of the surface of the bitumen core.

The coating layer precursor composition may comprise at least one solvent in order to facilitate its application.

For the purposes of the invention, the terms "viscosifying agent" and "viscosifying compound" are used interchangeably and independently of one another. The term "viscosifying agent" or "viscosifying compound" is intended to mean a compound which has the property of decreasing the fluidity of a liquid or a composition and thus of increasing the viscosity thereof.

For the purposes of the invention, the viscosifying agent is a material that has a dynamic viscosity greater than or equal to 50 $mPa \cdot s^{-1}$, preferably from 50 $mPa \cdot s^{-1}$ to 550 $mPa \cdot s^{-1}$, more preferentially from 80 $mPa \cdot s^{-1}$ to 450 $mPa \cdot s^{-1}$, the viscosity being a Brookfield viscosity measured at 65° C. The viscosity of a viscosifying agent according to the invention is measured at 65° C. by means of a Brookfield CAP 2000+ viscometer and at a rotation speed of 750 rpm. The measurement is read after 30 seconds for each temperature.

The coating layer is solid at high ambient temperature, in particular at a temperature greater than 60° C.

According to one embodiment of the invention, the average thickness of the coating layer is preferably greater than or equal to 20 µm, more preferentially from 20 to 200 µm, and even more preferentially from 40 to 150 µm, and even more preferentially from 50 to 100 µm. The coating layer must be thick enough for it to be continuous.

In addition to the cellulose ether compound and the anticaking agent, the coating layer may optionally comprise one or more compounds chosen from: the other viscosifying compounds, the chemical additives which have been described above, the polymers, the plasticizers, the surfactants, etc.

The coating composition preferably comprises, on the basis of its final composition, from 5% to 40% by weight of plasticizer, in particular from 5% to 25% by weight, with preferentially a weight content of from 5% to 20%. For that, it is possible to use a plasticizer that is customary in film coating compositions.

Among the plasticizers, mention may be made of fatty acids, for instance stearic acid, or mixtures of fatty acids, such as the product sold under the trade name Miglyol®.

According to one preferred embodiment, the coating layer essentially consists of:
  one or more viscosifying compounds chosen from cellulose ethers, and
  at least one anticaking agent.

Advantageously, according to this embodiment, the coating layer comprises, or better still essentially consists of:
  one or more cellulose ethers and
  at least 10% of one or more anticaking agents,
  the percentages being expressed by weight relative to the total weight of the coating layer.

Even more advantageously, according to this embodiment, the coating layer comprises, or better still essentially consists of:
  one or more cellulose ethers and
  at least 20%, even better still at least 30%, advantageously at least 40% and even more advantageously at least 50% of one or more anticaking agents,
  the percentages being expressed by weight relative to the total weight of the coating layer.

According to another preferred embodiment, the coating layer essentially consists of:
  one or more viscosifying compounds chosen from cellulose ethers,
  at least one anticaking agent, and
  at least one plasticizer.

Advantageously, according to this embodiment, the coating layer comprises, or better still essentially consists of:
  one or more cellulose ethers,
  at least 10% of one or more anticaking agents,
  at least one plasticizer,
  the percentages being expressed by weight relative to the total weight of the coating layer.

Even more advantageously, according to this embodiment, the coating layer comprises, or better still essentially consists of:
  one or more cellulose ethers and
  at least 20%, even better still at least 30%, advantageously at least 40% and even more advantageously at least 50% of one or more anticaking agents,
  at least one plasticizer,
  the percentages being expressed by weight relative to the total weight of the coating layer.

Advantageously, the second composition is in the form of a solution or a dispersion in a solvent.

The solvent is advantageously chosen from water and mixtures of water and water-miscible organic solvents such as alcohols, for example ethanol, methanol, glycerol.

Preferably, the concentration of material other than the solvent in said solutions and/or dispersions is from 50 g/l to 500 g/l, preferably from 75 g/l to 300 g/l and even more preferentially from 100 g/l to 250 g/l.

The Cellulose Ether

The cellulose ether is a cellulose derivative in which all or some of the hydroxyl functions of the cellulose have reacted with a chemical reagent so as to form an ether. Other functionalizations of the cellulose are possible in addition to the ether functions. The cellulose ether may be in the form of a salt.

Among the cellulose ethers, mention may be made of: methylcellulose, ethylcellulose, hydroxymethylcellulose hydroxyethylcellulose (HEC), hydroxypropylcellulose (HPC), hydroxyethylmethylcellulose (HEMC), hydroxypropylmethylcellulose (HPMC), hydroxybutylmethylcellulose (HBMC), carboxymethylcellulose (CMC), sodium carboxymethylcellulose (Na-CMC), carboxymethylsulfoethylcellulose, hydroxyethylmethylcarboxymethylcellulose.

Advantageously, the cellulose ether(s) are chosen from cellulose ethers with a hydrophilic nature.

Advantageously, the cellulose ether(s) are chosen from: hydroxyethylmethylcellulose, hydroxypropylmethylcellulose, hydroxybutylmethylcellulose, even more advantageously hydroxypropylmethylcellulose.

Preferably, the coating layer comprises at least 10% by weight of one or more viscosifying compounds chosen from cellulose ethers, relative to the weight of the coating layer, more preferentially at least 20% by weight, and even more preferentially at least 30% by weight.

Advantageously, the coating layer comprises at least 40% by weight of one or more viscosifying compounds chosen from cellulose ethers, more advantageously at least 50% by weight, relative to the total weight of the coating layer.

Even more advantageously, the coating layer comprises from 10% to 90% by weight of one or more viscosifying compounds chosen from cellulose ethers, preferably from 25% to 75% by weight, even more preferentially from 40% to 60% by weight, relative to the total weight of coating layer.

The Other Viscosifying Compounds:

Preferably, in addition to the cellulose ethers, the viscosifying agents are chosen from:
  gelling compounds preferably of plant or animal origin, such as: gelatin, agar-agar, alginates, starches, modified starches, or gellan gums;
  polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
  mixtures of such compounds.

Advantageously, in addition to the cellulose ethers, the viscosifying agents are chosen from:
  gelling compounds preferably of plant or animal origin, such as gelatin, agar agar, alginates, or gellan gums;
  polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
  mixtures of such compounds.

The Anticaking Compounds:

The anticaking compounds are of mineral or organic origin. The term "anticaking agent" or "anticaking compound" is intended to mean any compound which limits, reduces, inhibits, delays, the agglomeration and/or the adhesion of the pellets together during their transportation and/or their storage at ambient temperature and which ensures their fluidity during handling.

More preferentially, the anticaking compound is chosen from: talc; fines, also known as "fillers", generally less than 125 μm in diameter, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as fumed silica, functionalized fumed silica, in particular hydrophobic or hydrophilic fumed silica, pyrogenic silicas, in particular hydrophobic or hydrophilic pyrogenic silicas, silicates, silicon hydroxides and silicon oxides; plastic powder; lime; hydrated lime; plaster; rubber crumb; polymer powder, where the polymers are such as styrene/butadiene (SB) copolymers or styrene/butadiene/styrene (SBS) copolymers; and mixtures of these materials.

Advantageously, the anticaking agent is chosen from talc; fines, generally less than 125 μm in diameter, with the exception of limestone fines, such as siliceous fines; wood residues such as lignin, lignosulfonate, conifer needle powders, conifer cone powders, in particular pine powders; glass powder; sand such as Fontainebleau sand; fumed silicas, in particular hydrophobic or hydrophilic fumed silica; and mixtures thereof.

Preferably, the coating layer comprises at least 10% by weight of one or more anticaking agents, relative to the weight of the coating layer, more preferentially at least 20% by weight, and even more preferentially at least 30% by weight.

Advantageously, the coating layer comprises at least 40% by weight of one or more anticaking agents, more advantageously at least 50% by weight, relative to the total weight of the coating layer.

Even more advantageously, the coating layer comprises from 10% to 90% by weight of one or more anticaking agents, preferably from 25% to 75% by weight, even more preferentially from 40% to 60% by weight, relative to the total weight of coating layer.

The Pellets:

For the purposes of the invention, the term "pellets of material that can be used as a road binder or as a sealing binder" can also be defined as a material that can be used as a road binder or as a sealing binder that is solid at ambient temperature, packaged in a divided form, that is to say in the form of small units called pellets or particles, comprising a core based on material that can be used as a road binder or as a sealing binder and an envelope or shell or coat or coating layer or coating.

Preferably, the coating layer covering the pellets of material that can be used as a road binder or as a sealing binder according to the invention is continuous.

Preferably, the coating layer is applied so that at least 90% of the surface area of the core of said pellets is covered with the coating layer, preferably at least 95%, more preferentially at least 99%.

According to one embodiment of the invention, the coating layer covering at least one portion of the surface area of the core of the pellets represents from 0.2% to 20% by weight, preferably from 0.5% to 15% by weight, more preferentially from 1% to 10% relative to the total weight of the core of the pellets.

Preferably, the pellets of material that can be used as a road binder or as a sealing binder, advantageously of bitumen, according to the invention can have, within one and the same population of pellets, one or more shapes chosen from a cylindrical, spherical or semi-spherical or ovoid shape, preferably in a semi-spherical shape. The size of the pellets is such that the longest mean dimension is preferably less than or equal to 50 mm, more preferentially from 2 to 30 mm and even more preferentially from 3 to 20 mm. The size and shape of the pellets may vary according to the manufacturing process employed. For example, the use of a die makes it possible to control the manufacture of pellets of a chosen size. Screening makes it possible to select pellets as a function of their size.

Preferably, the pellets of material that can be used as a road binder or as a sealing binder, advantageously the bitumen pellets, according to the invention have a weight of between 0.1 g and 50 g, preferably between 0.2 g and 10 g and more preferentially between 0.2 g and 5 g.

Without being bound to any theory, the applicant has discovered, unexpectedly, that the use of a viscosifying compound of the cellulose ether type and of at least one anticaking agent according to the invention makes it possible to obtain a coating layer:
  which is resistant to extreme climatic conditions and to the extreme transportation and/or storage conditions of the solid material that can be used as a road binder or as a sealing binder,
  which breaks easily under the effect of mechanical shear, for instance under the effect of mechanical shear applied in a tank such as a mixer or a mixing drum during the manufacture of bituminous mixes.
  which does not require an additional step after its application.

More particularly, the coating layer withstands the transportation and/or storage of the material that can be used as a road binder or as a sealing binder, in particular bitumen, at high ambient temperature, in particular at a temperature greater than 60° C., in "Big Bags", while at the same time being brittle under the effect of mechanical shear. It thus allows the release of the core during the manufacture of bituminous mixes.

According to one embodiment of the invention, the bitumen pellets may also comprise one or more other coating layers covering all or part of the coating layer of the solid material that can be used as a road binder or as a sealing binder, in particular bitumen, according to the invention.

Process for Manufacturing the Pellets:

Another subject of the invention relates to a process for manufacturing pellets of solid material that can be used as a road binder or as a sealing binder, in particular bitumen, composed of a core and a core coating layer, this process comprising:
  i) shaping the core from at least a first composition, and
  ii) coating the core on all or part of its surface with at least one second composition comprising at least one viscosifying compound chosen from cellulose ethers and at least one anticaking compound.

Step ii) can be carried out by dipping, spraying, coextruding, etc. Preferably, step ii) is carried out by a process using a fluidized air bed device.

The shaping of the core of the pellets from a solid material that can be used as a road binder or as a sealing binder, in particular bitumen, can be carried out according to any known process, for example according to the manufacturing process described in document U.S. Pat. No. 3,026,568, WO 2009/153324 or WO 2012/168380. According to one specific embodiment, the shaping of the core of solid material can be carried out by draining, in particular using a drum.

Other techniques can be used in the process for the manufacture of the core of solid material, in particular molding, pelletizing, extrusion, etc.

The coating of the pellets of solid material that can be used as a road binder or as a sealing binder, in particular bitumen, can be carried out by any known technique, in particular by applying the second material in a fluidized air bed process, as described for example in U.S. Pat. No. 5,236,503 or in EP 1 407 814.

Preferably, particles of solid material core have a longest average dimension ranging from 1 to 30 mm, advantageously from 2 to 20 mm, even more advantageously from 2 to 10 mm.

Preferably, during the implementation of the process of the invention, the weight ratio of the coating layer to the weight of the core, optionally additivated, is from 0.05 to 1, advantageously from 0.1 to 0.9, even more advantageously from 0.1 to 0.5.

Another subject of the invention consists of pellets of solid material that can be used as a road binder or as a sealing binder, in particular bitumen, which can be obtained by implementing the process according to the invention as described above. Such pellets advantageously have the properties described above.

Uses of the Pellets:

Another subject of the invention also relates to the use of the pellets according to the invention as a road binder.

The road binder can be employed to manufacture bituminous mixes, in combination with aggregates, according to any known process.

Preferably, the pellets of solid material that can be used as a road binder or as a sealing binder, in particular bitumen, according to the invention, are used for the manufacture of bituminous mixes.

Bituminous or non-bituminous mixes are used as materials for the construction and maintenance of road foundations and of their coating, and also for performing all roadway works. Examples that may be mentioned include surface dressings, hot bituminous mixes, cold bituminous mixes, cold cast bituminous mixes, emulsion gravels, base courses, tie coats, tack coats and rolling courses, and other combinations of a bituminous or non-bituminous binder and of the road aggregate having particular properties, such as rutting-resistant courses, draining bituminous mixes, or asphalts (mixture between a bituminous binder and aggregates such as sand).

Another subject of the invention relates to a process for manufacturing bituminous mixes comprising at least one road binder and aggregates, the road binder being chosen from the pellets of solid material according to the invention, this process comprising at least the steps of:
  heating the aggregates to a temperature ranging from 100° C. to 180° C., preferably from 120° C. to 160° C.,
  mixing the aggregates with the road binder in a tank such as a mixer or a mixing drum,
  obtaining bituminous mixes.

The process of the invention exhibits the advantage of being able to be employed without a preliminary step of heating the pellets of solid material.

The process for manufacturing bituminous mixes according to the invention does not require a step of heating the pellets before mixing with the aggregates because, in contact with the hot aggregates, the pellets melt.

The pellets of solid material that can be used as a road binder or as a sealing binder, in particular bitumen, according to the invention as described above have the advantage of being able to be added directly to the hot aggregates, without having to be melted prior to the mixing with the hot aggregates.

Preferably, the step of mixing of the aggregates and of the road binder is performed with stirring, and stirring is then maintained for not more than 5 minutes, preferably not more than 2 minutes to allow the obtaining of a homogeneous mixture.

The pellets according to the present invention are noteworthy in that they allow the transportation and/or storage and/or handling of road bitumen at high ambient temperature under extreme conditions, in particular without agglomeration and/or adhesion of the pellets of solid material during the transportation and/or storage and/or handling thereof. Moreover, the coating layer of the pellets breaks under the effect of the contact with the hot aggregates and of the shear, and it releases the composition forming the core. Finally, the presence of the coating layer in the mixture of road binder and of aggregates does not degrade the properties of said road bitumen for a road application, when compared with an uncoated core composition.

Process for Transporting and/or Storing and/or Handling Solid Material that can be Used as a Road Binder or as a Coating Binder The pellets obtained via the process of the invention may be transported and/or stored and/or handled in the form of pellets of solid material, in particular of bitumen, that are solid at ambient temperature.

The solid material, especially the road bitumen, may be transported and/or stored at high ambient temperature for a period of more than or equal to 2 months, preferably 3 months.

Preferably, the high ambient temperature is from 20° C. to 90° C., preferably from 20° C. to 80° C., more preferentially from 40° C. to 80° C. and even more preferentially from 40° C. to 60° C.

The pellets of solid material, especially of bitumen, obtained via the process according to the invention have the advantage of conserving their divided form, and thus of being able to be handled, after storage and/or transportation at high ambient temperature. They exhibit in particular the ability to flow under their own weight without creeping, which allows them to be stored packaged in bags, in drums or in containers of any shape and of any volume and then to be transferred from this packaging to an item of equipment, such as a worksite item of equipment (tank, mixer, etc.).

The pellets of solid material, especially of bitumen, are preferably transported and/or stored in bulk in 1 kg to 100 kg or 500 kg to 1000 kg bags, commonly known in the field of road bitumens as "big bags", said bags preferably being made of hot-melt material. They may also be transported and/or stored in bulk in 5 kg to 30 kg boxes or in 100 kg to 200 kg drums.

The various embodiments, variant, preferences and advantages described above for each of the subjects of the invention apply to all the subjects of the invention and can be taken separately or in combination.

FIGURE

FIG. 1: Sectional view of the fluidized air bed facility

Referring to FIG. 1, the fluidized air bed (12) facility (10) (also known as a granulator) comprises a fluidized air bed (12) process chamber (II) in which the cores of a bituminous material (14) are placed and in which an air stream (16) is fed from below to the fluidized bed (12) and through a perforated grid (13) in order to maintain the fluidized bed and in order to dry and/or cool the shells formed around the cores of bituminous material (14). A coating layer precursor composition (18) is then fed to the fluidized bed by means of a spray nozzle (20) emerging from below into the fluidized bed (12). The fluidized bed (12) process chamber (II) also comprises an insert (22) located above the spray nozzle (20) and in the form of a cylindrical facility piece that can be adjusted in height and diameter and the lower edges (15) of which are adjustably spaced from the perforated grid (13) of the bottom of the fluidized bed (12).

The filtration chamber (IV) comprises several filters (24) for recycling the fine particles emitted during the implementation of the process.

The air stream (16) fed to the fluidized bed (12) is guided by an incoming air housing (I) comprising an incoming air chamber (26).

The fluidized air bed (12) granulator thus comprises 4 distinct zones: (I) the incoming air housing, (II) the process chamber, (III) the expansion chamber and (IV) the filtration chamber.

The zone of the fluidized bed formed by the incoming air chamber (26) has a zone (28) with a higher flow rate of the air stream (16) applied to the cores made of a bituminous material (14).

The coating layer precursor composition (18) is fed into the zone (28) operating at a higher flow rate.

The cores made of a bituminous material (14) originating from the zone (28) at a higher flow rate are returned to the fluidized bed (12).

A portion of the cores made of bituminous material (14) present in the fluidized bed (12) is returned to the zone (28) at higher flow rate, so that a circulation of cores made of bituminous material (14) appears between the fluidized bed (12) and the zone (28) at higher flow rate.

The invention is illustrated by the following examples, which are given without any implied limitation.

Experimental Section

In these examples, the parts and percentages are expressed by weight unless otherwise indicated.

Material

Fluidized Air Bed Device:

Facility 1:

Facility 1 is a fluidized air bed facility used in the process for manufacturing the pellets according to the invention.

The following examples 1 to 6 were carried out in a fluidized air bed granulator sold by the company Glatt—under the trade name ProCell—and the sectional view of which is represented in FIG. 1.

Starting Materials:

The cores of bituminous material used as starting material in the examples below are composed of:

Bituminous base (B): a bitumen base of 50/70 grade, denoted $B_1$, having a penetrability $P_{25}$ of 58 1/10 mm and an RBSP of 49.6° C. and commercially available from the Total group under the brand name Azalt®;

Additive:
Additive A1 of formula (I): sebacic acid
Additive A2 of formula (II): N,N'-ethylenedi(stearamide) sold by the company Croda under the name Crodawax 140®
Core Composition

TABLE 1 composition of the bituminous binder constituting the pellet core

|  | C1 |
| --- | --- |
| Bitumen base | B1 |
| A1 | 1.5% |
| A2 | 2.5% |

The amounts are expressed as percentage by weight of additive compound relative to the total weight of the composition.

The coating composition used for coating the cores of the pellets is prepared from the following compounds:

Viscosifying Agent:
Viscosifying agent V1: hydroxypropylmethylcellulose introduced in the form of Sepifilm® LP 010 commercially available from the company SEPPIC,
Viscosifying agent V2: Cellulose (CAS 9004-34-6) commercially available from the company Sigma-Aldrich,
Viscosifying agent V3: Gelatin of type 280 Bloom 6 Mesh-Pig Skin commercially available from the company Weishardt International.

Anticaking Agent:
Anticaking agent AG1: siliceous fines originating from La Noubleau.

Processes and Methods:

I—Preparation of the Pellet Cores

1. Preparation of the Core Composition

The bitumen base $B_1$ is introduced into a reactor maintained at 160° C. with stirring at 300 rpm for two hours. The additives are then introduced into the reactor. The contents of the reactor are maintained at 160° C. with stirring at 300 rpm for 1 hour.

2. Preparation of the Cores of the Solid Binder Pellets a) General Method for Preparing the Binder Cores of the Pellets According to the Invention The core composition is reheated at 160° C. for two hours in an oven before being poured into a silicone mold exhibiting different holes of spherical shape, so as to form the solid binder cores. After having observed the solidification of the binder in the mold, the surplus is leveled off using a blade heated with a Bunsen burner. After 30 minutes, the solid binder in the form of uncoated pellets is removed from the mold and stored in a tray covered with silicone paper. The binder cores are then allowed to cool to ambient temperature for 10 to 15 minutes.

b) General Method for Preparing the Bitumen Cores of the Pellets According to the Invention with an Industrial Process For the implementation of this method, use may be made of a device and of a process as described in great detail in U.S. Pat. No. 4,279,579. Various models of this device are commercially available from the company Sandvik under the trade name Rotoform®.

Bitumen pellets can also be obtained from the bituminous composition according to the invention poured into the tank of such a device and maintained at a temperature of between 130 and 160° C.

An injection nozzle or several injection nozzles make(s) possible the transfer of the bitumen composition according to the invention inside the double pelletizing drum comprising an external rotating drum, the two drums being equipped with slots, nozzles and orifices making possible the pelletizing of bitumen drops through the first stationary drum and orifices exhibiting a diameter of between 2 and 8 mm of the external rotating drum. The bitumen drops are deposited on the upper face of a horizontal conveyor belt driven by rollers.

Bitumen pellets were obtained from the bituminous composition C1 poured into the reservoir of such a device and maintained at a temperature of between 130 and 160° C.

One or more injection nozzles allow the transfer of the bituminous composition C1 inside the pelletizing twin drum including an external rotating drum, the two drums being equipped with slots, nozzles and orifices allowing the pelletizing of drops of bitumen through the first stationary drum and the orifices between 2 and 8 mm in diameter of the external rotating drum. The bitumen drops are deposited on the upper face of a horizontal conveyor belt driven by rollers.

II—Coating of the Pellet Cores

1. Preparation of the Coating Layer

The coating layer precursor composition is an aqueous composition comprising at least:
one viscosifying agent, and
one anticaking agent.

It is prepared by mixing the components at ambient temperature in water.

2. Coating of the Pellets a) General Method for Coating the Cores of Pellets According to the Invention (First Embodiment)

The bitumen cores obtained in I— are poured into the coating composition. They are then manually stirred in the solution for a few minutes then they are removed and placed on a plate and allowed to dry at ambient temperature (about 30° C.).

Solid bitumen pellets with a core/shell structure according to the invention are thus obtained.

b) General Method for Coating the Pellet Cores According to an Industrial Process (Second Embodiment)

The cores of bituminous material are loaded into the process chamber of the device in FIG. 1, the stream of air being in operation. The cores of bituminous material are thus fluidized by the stream of air injected into the process chamber. Finally, the coating layer precursor composition is sprayed into the process chamber by means of the spray nozzle.

III—Test of Load Strength of the Pellets

This test is carried out in order to evaluate the load strength of the pellets under a compressive stress. Specifically, this test makes it possible to simulate the temperature and compression conditions of the pellets on each other, to which they are subjected during transportation and/or storage in bulk in 10 to 100 kg bags or in 500 to 1000 kg big bags or in 200 kg drums, and to evaluate their strength under these conditions.

The load strength test is performed according to the following protocol: 5 ml of pellets are placed in a 20 ml syringe and the plunger is then placed on the pellets together with a weight of 208 g, representing a force applied as in a big bag. The whole thing is then placed in an incubator, either at a temperature of 25° C. for at least 24 h (tests of load strength at ambient temperature) or at a temperature of 65° C. for at least 4 hours (tests of load strength at high ambient temperature).

IV—Evaluation of the Tacky Aspect of the Pellets

The tacky aspect of the pellets is evaluated to the touch by a handler directly after the step of coating the cores (without a drying step).

For pellets of each type, the handler withdraws approximately ten pellets and evaluates the sticky nature of each of them by placing them first of all between two 40 fingers and by then attempting to separate the fingers from the surface of the pellet.

Results

1. Bitumen Pellets Coated by Means of a Fluidized Air Bed Device (Second Embodiment)

a) Preparation of the Bitumen Pellets

Experiments 1 to 6 are carried out in device 10 represented in FIG. 1 according to the coating method described in II-2.b).

The parameters for carrying out the various experiments are given in table 2 below. The spray pressure (in bar) is from 1 to 3 bar.

The coating composition used in experiments 1 to 6 is prepared from:

hydroxypropylmethylcellulose as viscosifying agent (agent V1), and siliceous fines originating from La Noubleau as anticaking agent (agent AG1).

TABLE 2

| Examples | 1 | 2 (*) | 3 (*) | 4 (*) | 5 | 6 |
|---|---|---|---|---|---|---|
| Coating layer precursor composition | | | | | | |
| % of viscosifying agent | — | 10 | 10 | 10 | 7.5 | 10 |
| % anticaking agent | 20 | — | — | — | 12.5 | 10 |
| Conditions for carrying out the process | | | | | | |
| Amount of cores fluidized (in g) | | 1050 | 937 | 1305 | 1107 | 1123 |
| Amount of precursor composition sprayed (in g) | 1003 | 407 | 194 | 224 | 1060 | 1000 |
| Fluidization flow rate (in m³/h) | 300 | 300 | 280 | 280 | 250 | 250 |
| Product temperature (in ° C.) | 35 | 35 | 35 | 35 | 17 | 17 |
| Spray flow rate (in g/min) | 25.1 | 22.6 | 10.8 | 3.3 | 15.4 | 14.1 |

(*) following the agglomeration of the pellets during the process, the latter was interrupted before having sprayed all of the precursor composition.

Examples 1 to 4 are counter examples.
Examples 5 and 6 are examples according to the invention.

b) Evaluation of the Bitumen Pellets Obtained

The pellets obtained in examples 1 to 6 are then evaluated according to several criteria:

1) the obtaining of bitumen pellets comprising a core and a coating layer,
2) the homogeneity of the coating layer formed,
3) the deformation of the pellets,
4) the presence of agglomerates, and
5) their resistance at high temperature (load strength evaluated at 65° C. for 4 h).

The results are presented in table 3 below.

TABLE 3

| Examples | 1 | 2 | 3 | 4 | 5 | 6 |
|---|---|---|---|---|---|---|
| Pellet formation | yes | no | no | no | yes | yes |
| Resistance at ambient temperature at 65° C. | − | − | − | − | ++ | +++ |

+++: the pellets retain their initial shape and do not adhere to one another.
++: the pellets do not adhere to one another but no longer exhibit their rounded shape.
+: the pellets adhere slightly to one another.
−: the pellets are agglomerated.

Coating layer comprising exclusively an anticaking agent (example 1)

In example 1, the coating layer precursor composition comprises only an anticaking agent.

It is noted that the bitumen pellets obtained according to example 1 are not stable at high temperature.

The sole presence of an anticaking agent in the coating layer precursor composition does not make it possible to obtain bitumen pellets that are stable at high temperature.

Coating layer comprising only a viscosifying agent chosen from cellulose ethers (examples 2, 3, 4)

In examples 2, 3 and 4, the coating layer precursor composition comprises exclusively a viscosifying agent chosen from cellulose ethers.

The cores and the coating layer precursor composition sprayed in the process chamber stick to one another without however forming pellets. The cores agglomerate and make the formation of bitumen pellets impossible.

The sole presence of a viscosifying agent chosen from cellulose ethers in the coating layer precursor composition does not make it possible to obtain well-separated bitumen pellets.

Coating layer comprising both a viscosifying agent chosen from cellulose ethers and an anticaking agent (examples 5 and 6)

In examples 5 and 6, the coating layer precursor composition comprises both a viscosifying agent chosen from cellulose ethers and an anticaking agent.

The bitumen pellets formed in examples 5 and 6 exhibit good resistance to conditioning at an ambient temperature of 65° C. in so far as they virtually do not adhere to one another.

The pellets formed in example 6 are particularly advantageous in that they retain their initial shape.

Thus, the handling and transportation/storage of said pellets formed in examples 5 and 6 will be easy in so far as the pellets do not agglomerate together at high ambient temperature.

2. Bitumen Pellets Coated by Dipping (First Embodiment)

a) Preparation of the Bitumen Pellets

For experiments 7, 8 and 9, the coating of the bitumen cores is carried out by dipping in the coating composition according to the method described in II-2.a).

The nature of the coating composition used for each of experiments 7, 8 and 9 is given in table 4 below.

TABLE 4

| Examples | 7 | 8 | 9 |
|---|---|---|---|
| Viscosifying agent | | | |
| % Agent V1 | 14.3 | — | — |
| % Agent V2 | — | 14.3 | — |
| % Agent V3 | — | — | 14.3 |
| Anticaking agent | | | |
| % Agent AG1 | 14.3 | 14.3 | 14.3 |

Experiment 7 is according to the invention.
Experiments 8 and 9 are comparative.
b) Evaluation of the Bitumen Pellets Obtained The pellets obtained in examples 7 to 9 are then evaluated according to several criteria:
1) the tacky aspect of the coating layer, and
2) their behavior at ambient temperature (load strength evaluated at 25° C. for 24 h).

The results are given in table 5 below.

TABLE 5

| Examples | 7 | 8 | 9 |
|---|---|---|---|
| Tacky aspect | no | yes | yes |
| Behavior at ambient temperature at 25° C. | +++ | + | + |

+++: the pellets keep their initial shape and do not adhere together
++: the pellets do not adhere together but no longer keep their rounded shape +: the pellets adhere together slightly.
−: the pellets are agglomerated.
* Tacky aspect of the pellets The pellets prepared in example 7 are advantageous in that they do not stick. The latter can therefore be bagged and stored directly after the coating step without the need for an additional drying step.

Conversely, the pellets prepared in examples 8 and 9 are tacky. Consequently, it is necessary for these pellets to be subjected to an additional step of drying the coating layer, before it is possible to bag them.
*Behavior at Ambient Temperature at 25° C.

The pellets prepared in examples 8 and 9 adhere slightly together.

The pellets prepared in example 7 are advantageous in that they retain their initial shape and do not exhibit any adhesion.

Consequently, the handling and transportation/storage of the pellets formed in example 7 are easy in as much and do not cause any detrimental modifications of the state of the pellets.

The invention claimed is:

1. Pellets of material that can be used as a road binder or as a sealing binder, comprising a core and a coating layer, wherein:
the core consists of a first composition comprising at least one material selected from the group consisting of: a bitumen base, a pitch and a clear binder, and
the coating layer consists of a second composition which comprises, relative to the total weight of the coating layer:
from 10% to 90% by weight of at least one viscosifying compound, selected from the group consisting of cellulose ethers, and
from 10% to 90% by weight of at least one anticaking agent, which is siliceous fines.

2. The pellets as claimed in claim 1, wherein the cellulose ether is selected from the group consisting of: methylcellulose, ethylcellulose, hydroxymethylcellulose, hydroxyethylcellulose (HEC), hydroxypropylcellulose (HPC), hydroxyethylmethylcellulose (HEMC), hydroxypropylmethylcellulose (HPMC), hydroxybutylmethylcellulose (HBMC), carboxymethylcellulose (CMC), sodium carboxymethylcellulose (Na-CMC), carboxymethylsulfoethylcellulose, and hydroxyethylmethylcarboxymethylcellulose.

3. The pellets as claimed in claim 2, wherein the cellulose ether is selected from the group consisting of: hydroxyethylmethylcellulose, hydroxypropylmethylcellulose and hydroxybutylmethylcellulose.

4. The pellets as claimed in claim 3, wherein the cellulose ether is hydroxypropylmethylcellulose.

5. The pellets as claimed in claim 1, wherein the first composition has a needle penetrability measured at 25° C. according to the standard EN 1426 of from 5 to 330 1/10 mm.

6. The pellets as claimed in claim 5, wherein the first composition has a needle penetrability measured at 25° C. according to the standard EN 1426 of from 10 to 220 1/10 mm.

7. The pellets as claimed in claim 1, wherein the first composition also comprises at least one chemical additive selected from the group consisting of: an organic compound, a paraffin, a polyphosphoric acid, an adhesion dopant, and mixtures thereof.

8. The pellets as claimed in claim 1, wherein the coating layer is solid at a temperature greater than 60° C.

9. The pellets as claimed in claim 1, wherein the coating layer has an average thickness greater than or equal to 20 μm.

10. A process for manufacturing pellets of material that can be used as a road binder or as a sealing binder, composed of a core and a core coating layer as claimed in claim 1, this process comprising:
i) shaping the core from a first composition comprising at least one material selected from the group consisting of: a bitumen base, a pitch and a clear binder,
ii) coating the core on all or part of its surface with a second composition comprising (a) at least one viscosifying compound selected from the group consisting of cellulose ethers and (b) at least one anticaking agent.

11. The process as claimed in claim 10, wherein the second composition is applied to the core of the pellets in a fluidized air bed device.

12. The pellets as claimed in claim 1, which show stability on transportation or storage or handling at a temperature ranging from 20° C. to 100° C., for a period of greater than or equal to 2 months.

13. The pellets as claimed in claim 1, which show stability on transportation or storage or handling at a temperature ranging from 20° C. to 80° C. for a period of greater than or equal to 3 months.

14. The pellets as claimed in claim 1, which have a weight of between 0.1 g and 50 g.

15. A process for manufacturing bituminous mixes comprising at least one road binder and aggregates, the road binder being chosen from the pellets as claimed in claim 1, this process comprising at least the steps of:
heating the aggregates to a temperature ranging from 100° C. to 180° C., mixing the aggregates with the road binder in a tank, obtaining bituminous mixes.

16. The process as claimed in claim 15 wherein the process comprises the step of heating the aggregates to a temperature ranging from 120° C. to 160° C.

17. The process as claimed in claim 15, which does not comprise a step of heating the road binder before it is mixed with the aggregates.

18. The process as claimed in claim 15, wherein the step of mixing the aggregates with the road binder is performed with stirring, and stirring is then maintained for not more than 5 minutes.

* * * * *